United States Patent [19]
Takamoto et al.

[11] Patent Number: 5,640,596
[45] Date of Patent: Jun. 17, 1997

[54] INPUT OUTPUT CONTROL SYSTEM FOR TRANSFERRING CONTROL PROGRAMS COLLECTIVELY AS ONE TRANSFER UNIT DESIGNATED BY PLURALITY OF INPUT OUTPUT REQUESTS TO BE EXECUTED

[75] Inventors: Yoshifumi Takamoto, Hachioji; Hiroaki Odawara, Kokubunji, both of Japan

[73] Assignee: Hitachi, Ltd., Tokyo, Japan

[21] Appl. No.: 27,373

[22] Filed: Mar. 8, 1993

[30] Foreign Application Priority Data

Mar. 10, 1992 [JP] Japan .................................. 4-051299

[51] Int. Cl.⁶ ........................................................ G06F 15/02
[52] U.S. Cl. ........................................... 395/841; 371/40.1
[58] Field of Search .................................. 395/275, 425, 395/575, 500, 700, 841, 844; 371/10.1, 10.2, 11.1, 11.2, 20.1, 40.1; 364/238.3, 238.4, 239.4, 261, 261.1, 261.2

[56] References Cited

U.S. PATENT DOCUMENTS

| | | | |
|---|---|---|---|
| 4,888,691 | 12/1989 | George | 395/700 |
| 4,901,232 | 2/1990 | Harrington et al. | 395/826 |
| 4,939,644 | 7/1990 | Harrington et al. | 395/825 |
| 4,943,912 | 7/1990 | Aoyama et al. | 395/650 |
| 5,014,194 | 5/1991 | Itoh | 395/823 |
| 5,109,484 | 4/1992 | Hughes et al. | 395/200.1 |
| 5,179,660 | 1/1993 | DeVany et al. | 395/200.09 |
| 5,257,352 | 10/1993 | Yamamoto et al. | 395/463 |
| 5,337,402 | 8/1994 | Kitagawa et al. | 395/133 |
| 5,341,493 | 8/1994 | Yanai et al. | 395/488 |

FOREIGN PATENT DOCUMENTS

| | | |
|---|---|---|
| 0165915A2 | of 0000 | European Pat. Off. . |
| 0424658A2 | of 0000 | European Pat. Off. . |
| 60-183660 | 9/1985 | Japan . |
| 63-204448 | 8/1988 | Japan . |

OTHER PUBLICATIONS

Database WPIL, Week 9233, Derwent Publications Ltd., London, GB; AN 92-274775 and RD 339027, 920710, Abstract. (English).

Primary Examiner—Thomas C. Lee
Assistant Examiner—Moustafa Mohamed Meky
Attorney, Agent, or Firm—Fay, Sharpe, Beall, Fagan, Minnich & McKee

[57] ABSTRACT

In a system which includes an input-output controller provided with channel paths for receiving input/output requests from higher-rank apparatus, and an external storage controller connected to the input-output controller through the channels, the input-output controller registers input-output requests issued for the external storage devices from the higher-rank apparatus in input-output request queues and transfer one or plural ones of the channel programs registered in the input-output request queues collectively to the external storage controller, which control execution of the transferred channel programs, so that channel command words included in each transferred channel program are executed at timings which are adapted to an operation of one of the external storage devices which is to be controlled by the channel program.

54 Claims, 22 Drawing Sheets

| DEVICE IDENTIFIER 601 | I/O REQUEST QUEUE IDENTIFIER 602 | THE NUMBER OF WAITING REQUESTS 603 | USABLE CHANNEL DEVICE NO. 604 | CHANNEL DEVICE STATUS 605 |
|---|---|---|---|---|
| 10 | 1 | 5 | 1 | FREE |
|  | 1 |  | 2 | BUSY |
|  | 1 |  | 10 | BUSY |
| 20 | 2 | 1 | 4 | FREE |
|  | 3 | 2 | 8 | BUSY |
| 30 | 4 | 0 | 7 | FREE |

103

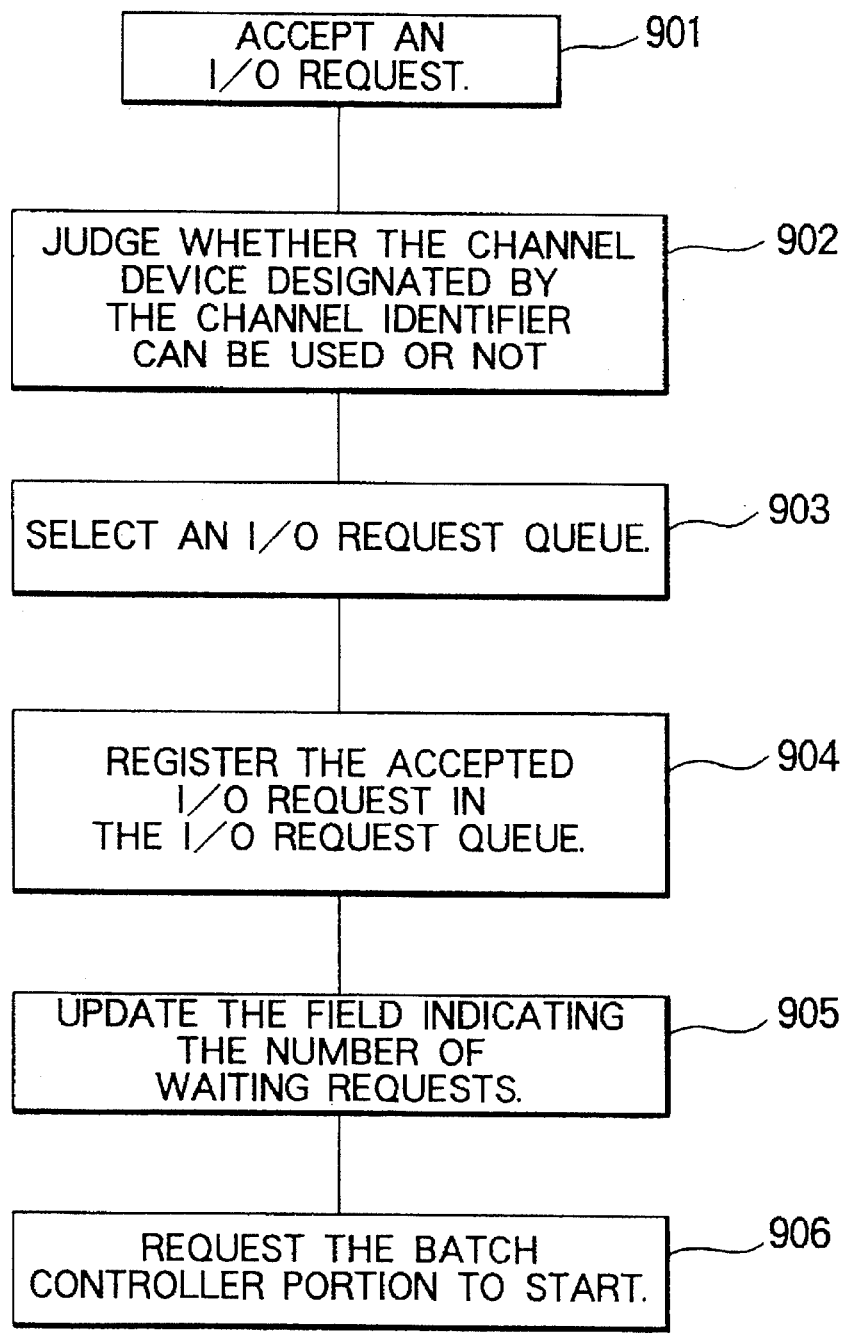

FIG. 13

| DISK DEVICE IDENTIFIER | COMMAND/DATA QUEUE IDENTIFIER | THE NUMBER OF WAITING REQUESTS | DISK DEVICE STATUS |
|---|---|---|---|
| 10 | 1 | 0 | FREE |
| 20 | 2 | 3 | BUSY |
| 30 | 3 | 5 | BUSY |
| 40 | 4 | 0 | FREE |

1101　1102　1103　1104

118

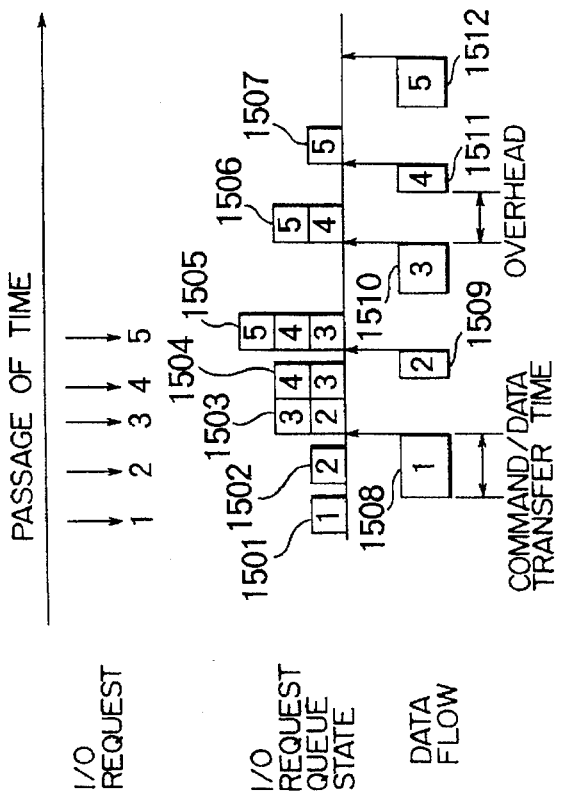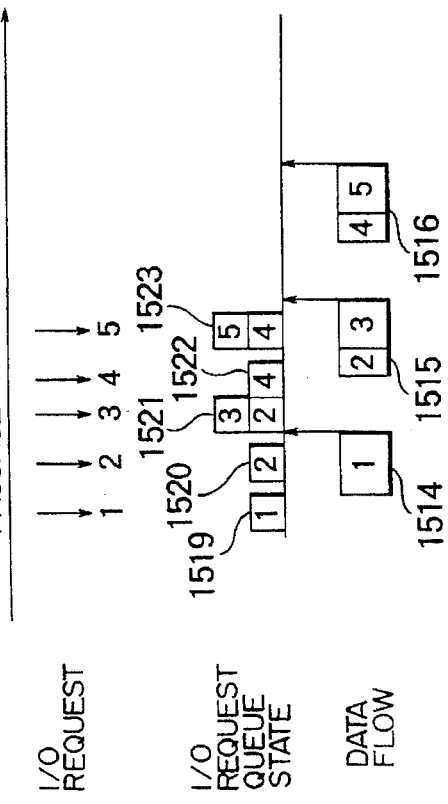
FIG. 17A  CONVENTIONAL CHANNEL DATA FLOW
FIG. 17B  CHANNEL DATA FLOW FIG. 22
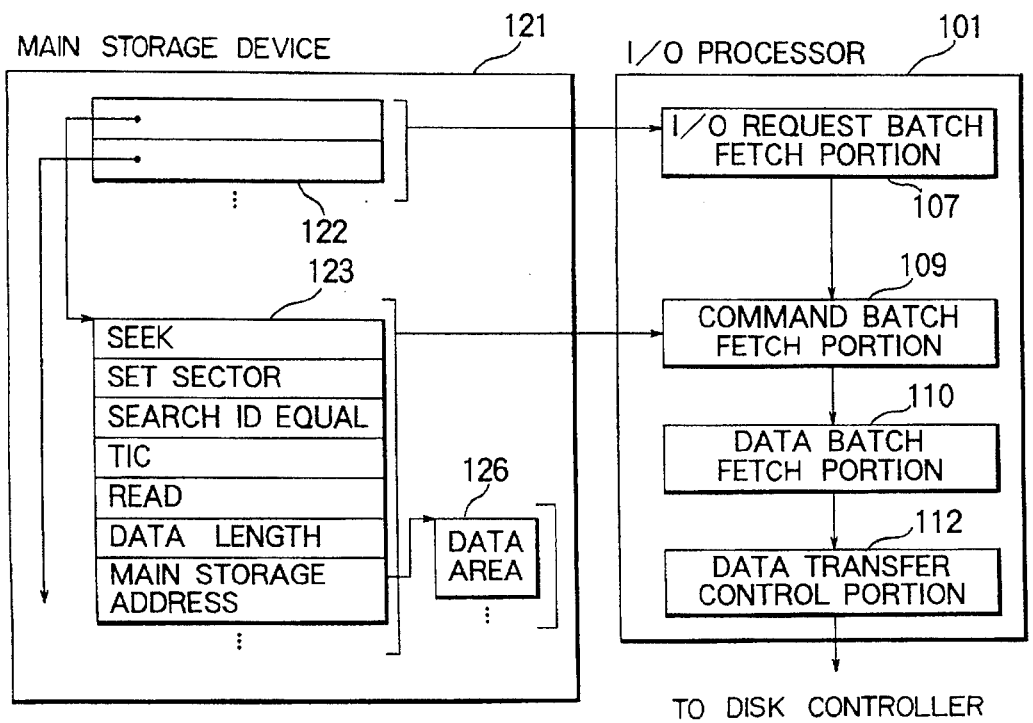
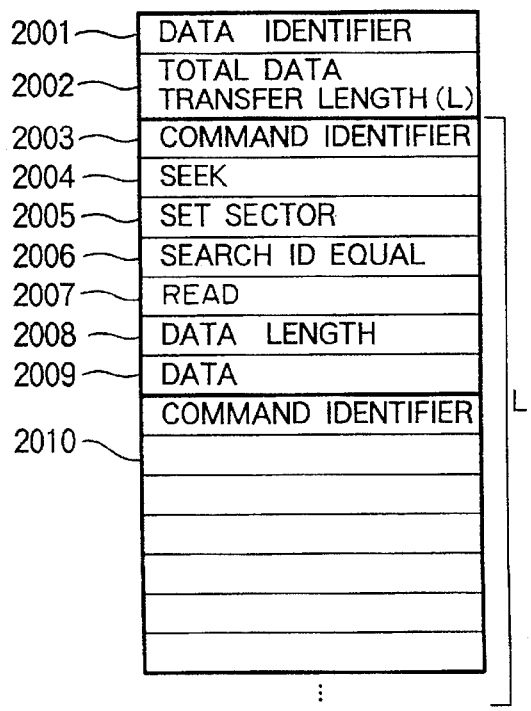

INPUT OUTPUT CONTROL SYSTEM FOR TRANSFERRING CONTROL PROGRAMS COLLECTIVELY AS ONE TRANSFER UNIT DESIGNATED BY PLURALITY OF INPUT OUTPUT REQUESTS TO BE EXECUTED

BACKGROUND OF THE INVENTION

The present invention relates to a computer system and particularly relates to a data input-output control method used in the case where high throughput and high-speed response are required, and an apparatus using the method.

This type input-output controller (I/O controller) is generally disposed between a higher-rank apparatus such as a central processing unit and devices such as secondary storage devices represented by magnetic disk devices so that a chief object thereof is to perform I/O processing between the higher-rank apparatus and the devices asynchronously.

The I/O controller and the devices are connected by a single channel path or a plurality of channel paths, so that I/O commands and data are transferred through the channel paths between the I/O controller and the devices. The channel paths and the devices may be connected in one-to-one correspondence or one-to-multi correspondence or multi-to-one correspondence. The I/O controller can process a plurality of I/O requests simultaneously. In this situation, channel paths may be so busy that commands and data cannot be transferred even in the case where an I/O request is issued from the higher-rank apparatus. As a conventional measure to cope with the problem, an I/O device is described in Japanese Patent Unexamined Publication No. Sho-60-183660. In the I/O device, an I/O request queue is provided on a storage device connected to the I/O device so that an I/O request can be registered in the queue and that the I/O request can be picked up from the queue and processed when a target channel path is free.

SUMMARY OF THE INVENTION

As described above, in the conventional method, I/O requests are picked up one by one from the queue and processed. Accordingly, overhead at the time of the starting of data transfer to the devices and overhead at the time of command analysis are imposed on each I/O request.

These overheads will be described below more specifically. The overheads are roughly classified into two types.

One type overhead is imposed on taking-out of I/O commands, data, etc., stored in a main storage device. When an I/O processor is to perform an I/O operation, it is necessary that I/O commands and data stored in the main storage device by a user or by an operating system are fetched in the I/O processor. Described more specifically, this type overhead occurs in the following procedure which shows a series of operations by which one I/O request constituted by a plurality of channel commands is repeatedly executed as long as the I/O request exists.

(1) Judging whether or not there is any I/O request;

(2) Taking out an I/O request;

(3) Invalidating the I/O request taken out;

(4) Extracting main storage addresses where channel commands are stored, from the I/O request;

(5) Taking one channel command out of the main storage device;

(6) Repeating the operation (5) unless one I/O request is terminated; and (7) Returning the situation of the procedure to the operation (1) to process the next I/O request.

The above-mentioned procedure is constituted by a plurality of micro-program modules. Accordingly, a procedure covering over a plurality of micro-program modules and, in some cases, a procedure covering over a plurality of microprocessors are required for execution of I/O processing. These procedures form one of the main causes of lowering of performance.

The other type overhead occurs when commands and data are transferred from the I/O processor to a disk controller. Described more specifically, this type overhead occurs in the following procedure which is carried out between the operations (5) and (6).

(a) Analyzing a channel command taken out of the main storage device;

(b) Judging whether the command is to be given to a disk controller or whether the command is to be given to the I/O processor, and transmitting the command to a designated disk controller only in the case where the command is to be given to the disk controller;

(c) Executing the command only in the case where the command is to be given to the I/O processor; and (d) Repeating the procedure of from the step (a) to the step (c) unless one I/O request is terminated.

These are overheads mainly caused by the fact that the I/O processor carries out processing synchronously with disk control. The disk controller carries out a series of procedures represented by commands such as SEEK, SEARCH and READ/WRITE but these commands are one-by-one transferred from the I/O processor to the disk controller. In the case of the SEARCH command which represents a procedure of judging whether the disk head has reached a predetermined position, however, the I/O processor starts execution of the next channel command immediately after the SEARCH command is transferred to the disk controller, so that the I/O processor cannot operate normally without any measure. That is, if the I/O processor executes the next READ/WRITE command at this point of time, unexpected data is read/written because READ/WRITE is executed on the current position of the disk head. Therefore, it is necessary to dispose a TIC command between the SEARCH command and the READ/WRITE command to thereby provide a procedure of continuously executing the SEARCH command until arrival of the disk head at the position where the target data exists is found by the SEARCH command. During this procedure, the I/O processor must execute commands for I/O processor's exclusive use, which have no direct relation with commands for the disk controller originally. The conventional method has advantages in: easy controlling; no large influence on performance under relatively low loading circumstances; etc. As the channel path transfer speed increases, the overhead rate however increases relatively. Assuming now that the conventional channel path transfer time and the overhead are as follows, Conventional Channel Path Transfer Time: 1 msec
Overhead 0.5 msec the overhead rate is 33%. Assuming now that the channel path transfer speed is improved by one figure in the condition that the overhead is constant, the channel path transfer time and the overhead in the case where data of the same data length is transferred are as follows.

High-speed Channel Path Transfer Time: 0.1 msec
Overhead 0.5 msec

As a result, the overhead rate is increased to 83%. That is, as the channel path transfer time is shortened, the overhead time occupies almost all of the channel path use time. Upon such circumstances, it may be considered that the channel path transfer time is enlarged by increasing the length of transferred I/O data for the purpose of reducing the overhead. For the change of the I/O data length, however, the change of an application program is forced.

An object of the present invention is to provide an input-Output control method by which the above-mentioned disadvantages in the prior art can be eliminated, and also provide an apparatus using the method.

Another object of the present invention is to provide an input-output control method by which high throughput and high-speed response can be achieved, and also provide an apparatus using the method.

According to the present invention, the input-output control method includes the steps of transmitting a channel program corresponding to at least one of the input-output requests stored in the input-output request queue from the input-output controller to an external storage controller so as to request execution of the channel program and controlling execution of the channel program by the external storage controller.

In a preferred embodiment of the present invention, the external storage controller performs queuing of the channel commands included in the received channel program so that the channel commands are sequentially executed at timings which are dependent upon operations of an external storage device which is to be controlled by said channel program.

Preferably, the input-output controller transmits plural channel programs to the external storage controller so as to request the external storage controller to execute those programs.

BRIEF DESCRIPTION OF THE DRAWINGS

FIG. 11 is a flow chart of processing in the channel path selection/input-output request registration portion;

FIG. 13 is a view showing an example of the disk device control table;

FIG. 17A is a view showing a flow of data in conventional channel control;

FIG. 17B is a view showing a flow of data in channel control according to the present invention;

FIG. 22 is a view showing the transfer of a channel program expressing a read request, to the disk controller;

DESCRIPTION OF THE PREFERRED EMBODIMENTS

A data input-output system and a data input-output control method in the system according to the present invention will be described below in detail with reference to the drawings.
(Embodiment 1)

Figure 1:
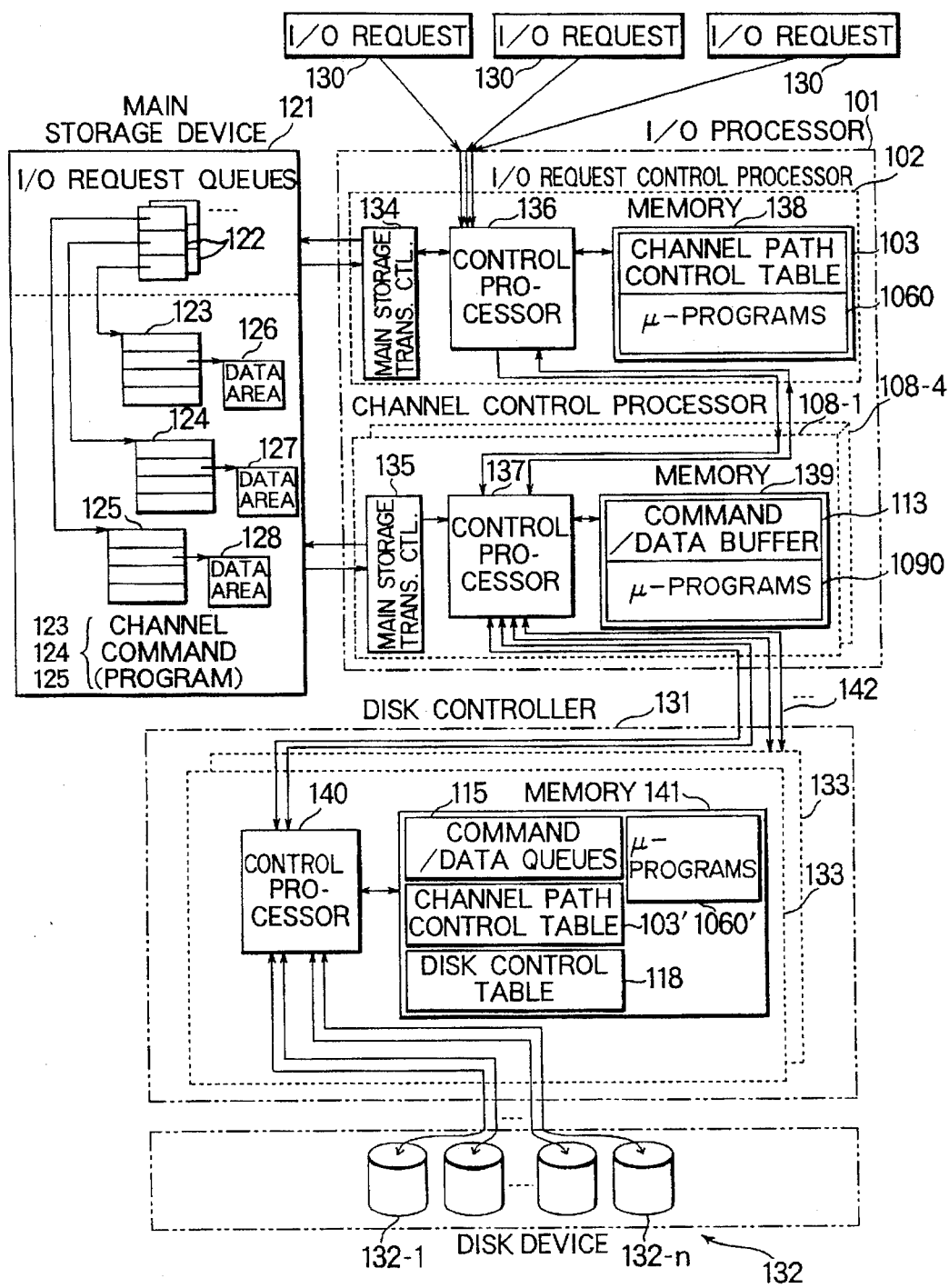
FIG. 1 is a block diagram showing the structure of an embodiment of an input-output subsystem to which a data input-output system and a data input-output control method in the system according to the present invention are applied.

FIG. 1 is a block diagram showing the total structure of an embodiment of an input-output subsystem (I/O subsystem) to which the present invention is applied. The I/O subsystem is mainly composed of an input-output controller or input-output processor (I/O controller or I/O processor) 101, an external storage controller or disk controller 131, external storage devices such as disk devices 132, and a main storage device 121. In the I/O subsystem according to the present invention, the I/O processor 101 performs input-output request acceptance processing or the like when an input-output request (I/O request) 130 is issued from a upper or higher-rank apparatus (not shown). Then, an input-output operation is completed by data transfer between the main storage device 121 and the disk controller 131. The I/O processor 101 is composed of an input-output control processor (I/O control processor) 102, and channel control processors (or channel devices) 108. The I/O control processor 102 is composed of a main storage transfer control portion 134 for performing data transfer control with respect to the main storage device 121, a control processor 136, and a memory 138. A channel control table 103 and microprograms (μ-programs) 1060 to be executed by the control processor 136 are stored in the memory 138. The control processor 136 executes the microprograms 1060 stored in the memory 138 and performs controlling for acceptance of the I/O request 130, or the like, while performing updating by reference to the control table 103. Each of the channel control processors 108-i (i=1-4) composed of a main storage transfer control portion 135, a control processor 137, and a memory 139. In each of the channel control processors 108, a command/data buffer 113 for temporarily storing commands and data are provided and microprograms 1090 to be executed by the control processor 137 are stored in the memory 139. These channel control processors 108-i perform data transfer with respect to the disk controller 131. The disk controller 131 is constituted by a plurality of disk control processors 133 each having a control processor 140, a memory 141, and so on. Each of the disk control processors 133 analyzes commands transferred from the I/O processor 101 and performs a disk input-output operation with respect to a number n (n: an integer of not smaller than 2) of disk devices 132 (132-1 to 132-n). Command/data queues 115 for temporarily storing commands/data transferred from the I/O processor 101, channel path control table 103', disc control table 118 and, microprograms 1060' to be executed by the control processor 140 and so on, are stored in the memory 141.

Figure 2:
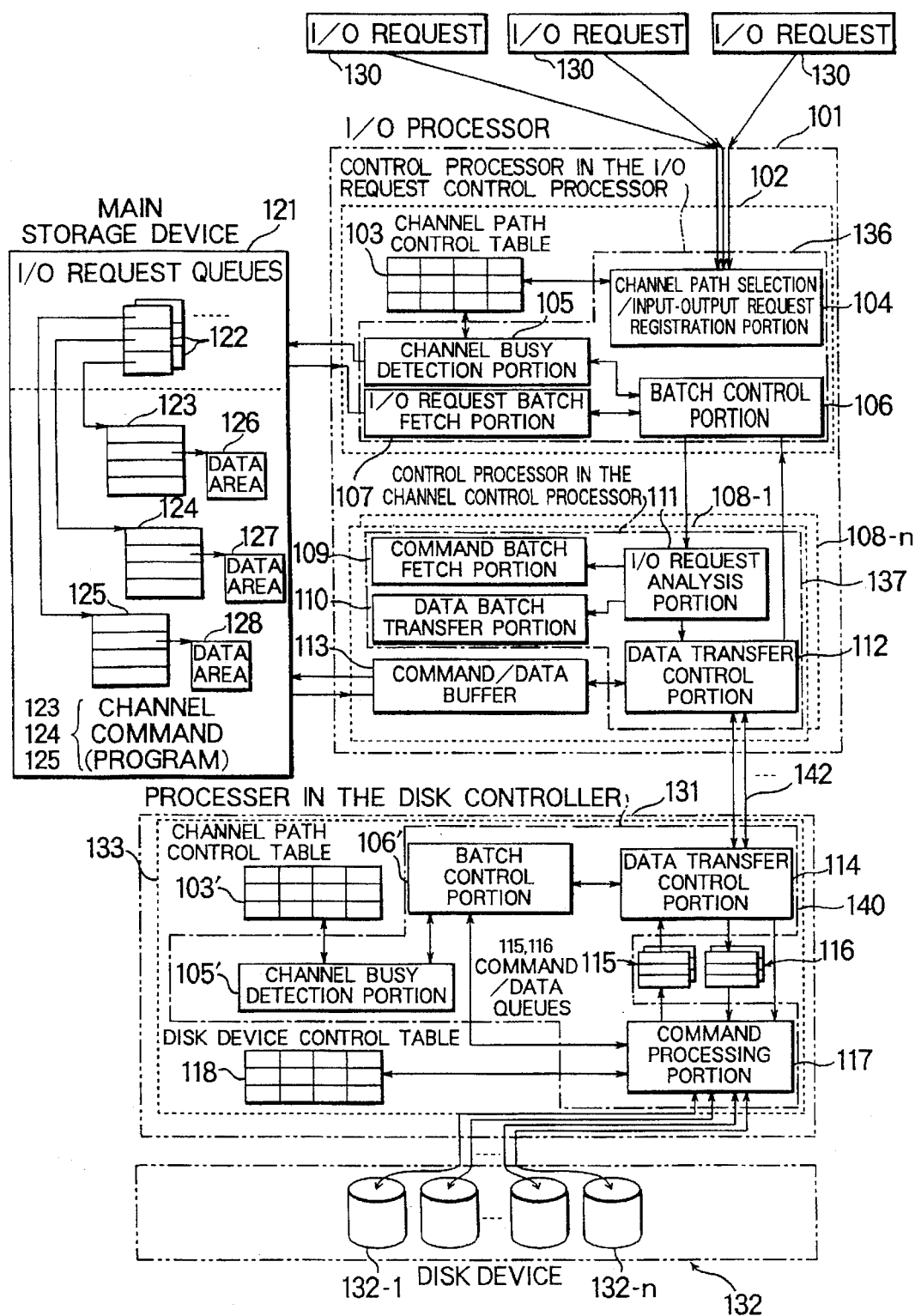
FIG. 2 is a block diagram showing the structure of respective control processors in FIG. 1.

FIG. 2 shows in detail microprogram routines executed by the structure of the respective control processors 136, 137 and 140. The I/O processor 101 operates independent of the higher-rank apparatus issuing the I/O request and performs I/O control of data transferred between the disk devices 132 (or the like) and the main storage device 121 according to the I/O request from the higher-rank apparatus. The I/O request control processor 102 executes microprograms, such as a channel path selection/input-output request registration portion 104, a batch control portion 106, a channel busy detection portion 105 and an I/O request batch fetch portion 107. Each of the channel control processors 108-i executes microprograms such as a command batch fetch portion 109, a data batch transfer portion 110, an I/O request analysis portion 111 and a data transfer control portion 112.

The disk controller 131 connected through channel paths 142 to the I/O processor 101 controls data I/O operations to disk devices 132 according to requests from the I/O processor 101. The disk controller 131 executes microprograms such as a batch control portion 106', a data transfer control portion 114, a command processing portion 117, and a channel busy detection portion 105'.

I/O request queues 122 used for I/O control by the I/O processor 101, areas for storing channel programs each comprised of channel command words 123, 124, 125, etc. (each of the reference numerals 123, 124 and 125 designates a channel program) pointed by the I/O requests held in the I/O request queues 122 are stored in the main storage device 121 and data areas 126, 127, 128, etc. for storing data attendant on the channel programs are secured in the main storage device 121.

Figure 3:
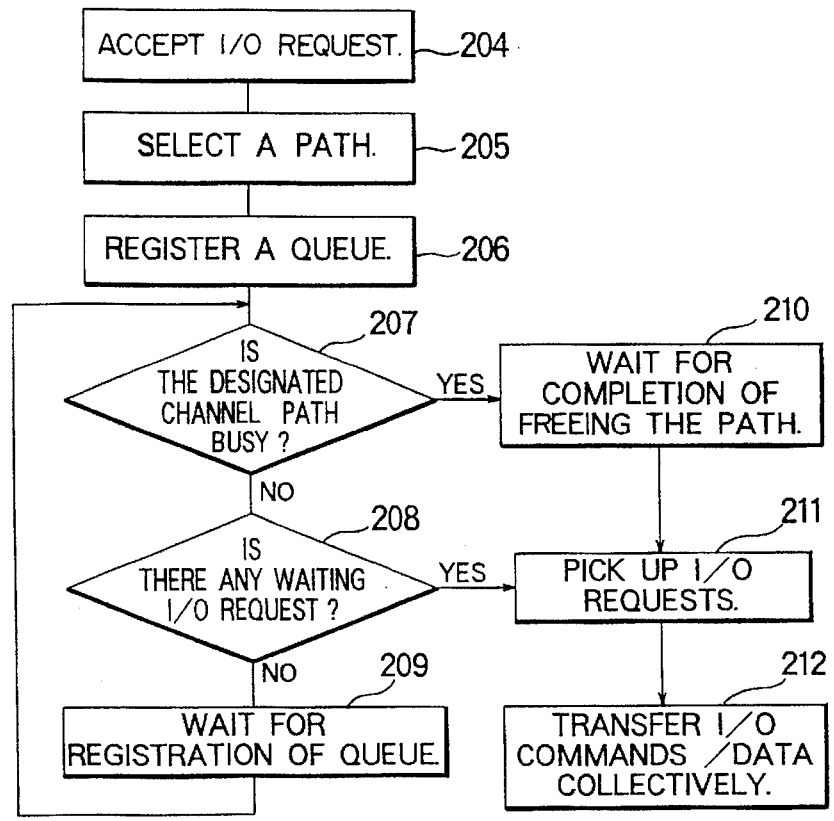
FIG. 3 is a flow chart showing processing in an input-output processor.

The outline of I/O processing in this embodiment will be described below with reference to FIG. 3 which shows a flow of processing in the I/O processor 101.

An I/O request 130 issued from a higher-rank apparatus (not shown) is accepted by the I/O processor 101 (step 204). Then, a judgment is made by the content of the I/O request 130 to determine a channel path through which data transfer is to be performed (step 205). This Judgment is performed by searching the channel path control table 103. Then, the I/O request 130 accepted in the step 206 is registered in a predetermined I/O request queue 122. In step 207, a detection is made as to whether the channel path determined in the step 205 is currently busy for transfer of another data. If the channel path is busy for transfer of another data, completion of the data transfer is awaited (step 210). The operation of waiting for completion of path freeing is canceled at a point of time when a report of path free is received. If the channel path is not busy in the step 207, the routine goes to step 208. In the step 208, a judgment is made as to whether waiting of an I/O request using the channel path is already present in the I/O request queues 122. If there is no waiting I/O request which uses the channel path, registration of a new I/O request is awaited (step 209). If there is a waiting I/O request which uses the channel path, which is the usual case, a plurality of I/O requests which use the channel path among all of I/O requests registered in the I/O request queues 122 are picked up (step 211) and channel programs and write data corresponding to the respective picked up I/O requests are read from the main storage 121 and are collectively transferred to the disk controller 131 (step 212). A point at which this embodiment is widely different from the prior art is that a plurality of I/O requests which use the same channel path are collectively picked up from the I/O request queues 122 and transferred to the disk controller 131. The disc controller controls execution of each command included in each transferred channel program. An overhead for reading a channel program and an overhead for exchange of commands between the input-output processor and the disc controller can be reduced so that high throughput can be provided.

This embodiment will be described more in detail.

First, I/O requests issued from higher-rank apparatus (not shown) in this embodiment will be described with reference to FIG. 4.

Figure 4:
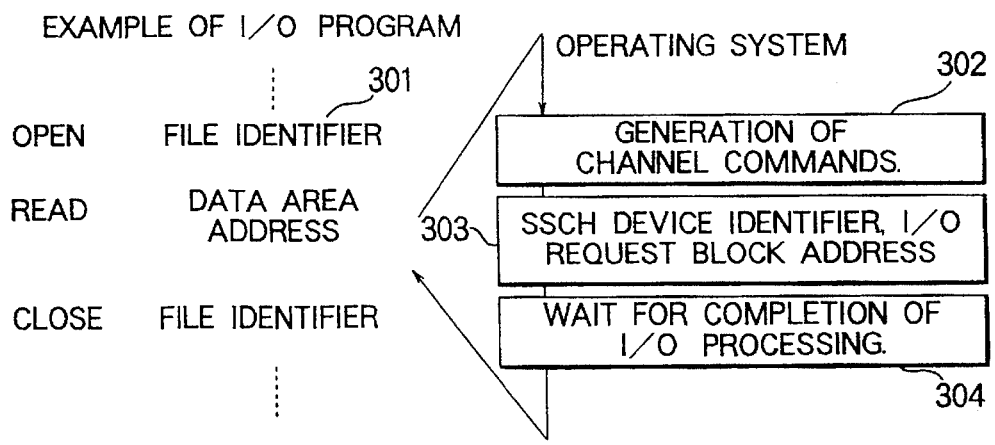
FIG. 4 is a view showing an example of input-output request.

FIG. 4 shows an example 301 of an I/O program for files stored in devices and the outline of operations (302 to 304) of an operating system for actually performing I/O to devices in response to a file I/O request from the program 301. The I/O program 301 is a generally used file I/O program. The file I/O is performed at a READ portion. Before and after the READ portion, before-and-after procedures (OPEN/CLOSE) are included in the program. At the READ portion, a data area in which data is to be stored and other information are designated as parameters. The operating system is started in response to the READ portion of the I/O program 301. In step 302, a channel program is generated. The channel program is comprised of a set of commands which describes operations to be executed by the I/O processor 101. I/O requests to disks, or the like, are included in the channel program. In step 303, operations described by the channel command words are committed to the I/O processor. At this time, parameters such as device identifier and I/O request block address are designated. The address in which the channel program is stored can be found from the I/O request block address. Then, in step 304, completion of I/O processing is awaited. Completion of I/O processing is achieved by returning interruption from the I/O processor 101 to the higher-rank apparatus. The waiting for completion of I/O processing is canceled by the interruption, so that processing in the I/O program 301 is continued.

Examples of channel programs which are interface programs between the I/O processor and higher-rank apparatus are shown in FIGS. 5A through 6B.

Figure 5A:
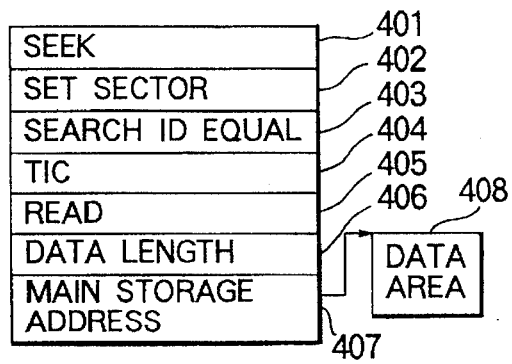
FIGS. 5A and 5B are views showing an example of channel programs.

FIGS. 5A to 6B show two types of channel programs used generally and also used in the present embodiment. The channel programs of a type 1 are shown in FIGS. 5A and 5B and they includes command words for controlling the disk head. In the drawings, the reference numerals 401 to 408 designate channel command words for a READ processing channel program, and 409 to 419 channel command words for a WRITE processing channel program. SEEK 401 is a channel command word for setting the position of a cylinder head to a target record of a disk. SET SECTOR 402 is a channel command word for setting the position of the cylinder head to a sector of the target record. SEARCH ID EQUAL 403 is a channel command word for checking the target record. TIC 404 generally means the operation of Jumping to SEARCH ID EQUAL 403. SEARCH ID EQUAL 403 and TIC 404 form a pair, so that SEARCH ID EQUAL 403 is repeated unless the target record is confirmed. When the condition (that the position of the cylinder head reaches the position of the target record) is established in SEARCH ID EQUAL 403, the program skips over TIC 404 to READ 405. READ 405 means reading of data from the current position of the disk head by a length indicated by DATA LENGTH 406. The data thus read is stored in a memory address indicated by MAIN STORAGE ADDRESS 407. The channel program shown in FIG. 5B is substantially similar in structure to the program in FIG. 5A except that READ 405 is replaced by WRITE 413. The processings of the two programs differs as follows.

Figure 5B:
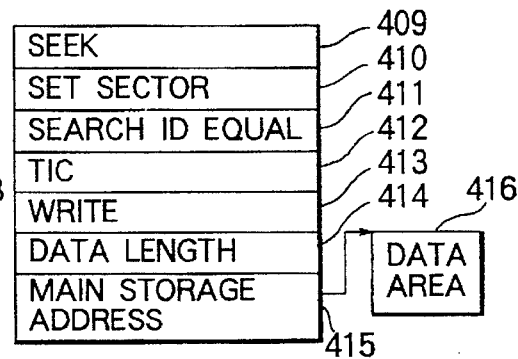

Read data is stored in the data area 408 designated by the channel command word 407 when the program of FIG. 5A is executed. On the contrary, data is stored in the data area 416 before execution of the channel program shown in FIG. 5B is started.

Figure 6A:
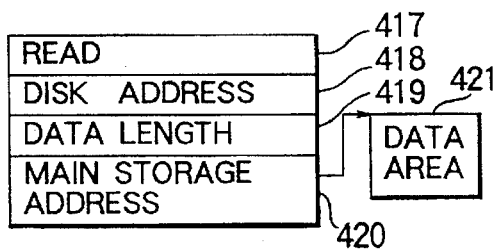
FIGS. 6A and 6B are views showing another example of channel programs.
Figure 6B:
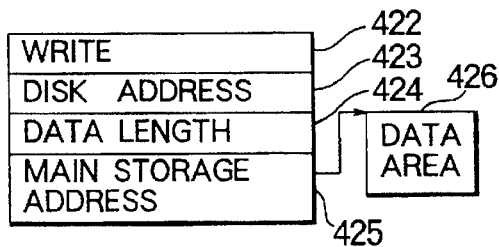

The channel programs of type 2 are shown in FIGS. 6A and 6B and they are different from the channel programs of type 1 and are simpler in form. The channel programs of type 1 describes controlling for disk head inside 401 to 407, and 409 to 415 of the channel programs, whereas the channel programs of type 2 does not describes such a series of controlling operations to a disc head such as SEEK, SET SECTOR, SEARCH ID EQUAL and TIC, but those operations are performed by the disk controller 131 only through designation of the requests (READ, WRITE) to the disk and designation of the position of the target record. The reference numerals 417 to 420 designate channel command words for a channel program for performing the READ operation and 422 to 425 channel command words for a channel program for performing the WRITE operation.

Figures 7, 8:
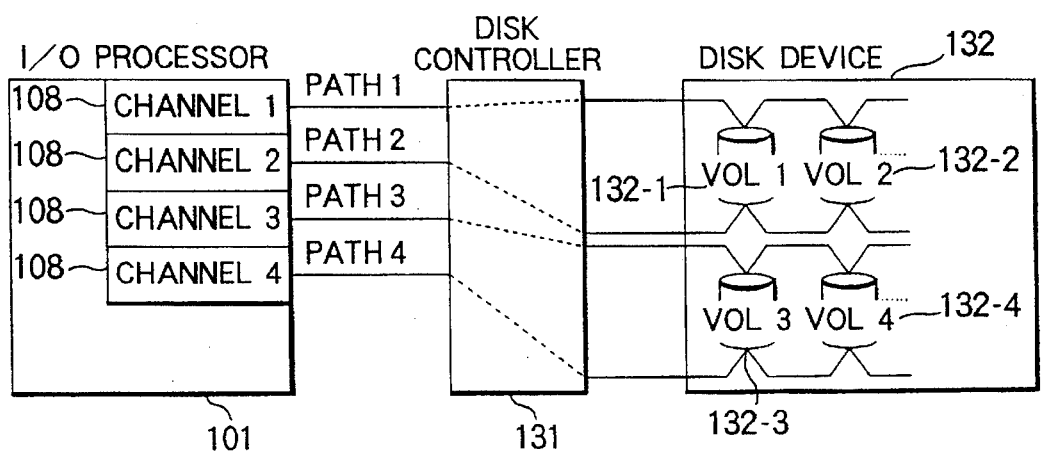
FIG. 7 is view showing an example of the structure in connection of disk devices.
FIG. 8 is a view showing an example of channel path control table.

FIG. 7 is a schematic view showing an example of the structure of connection of disk devices. The I/O processor 101 includes a plurality of channel control processors 108-i (which respectively correspond to channel paths 1 through 4 that are presumed to be present in this embodiment). A number n of disk devices 132 are connected to the disk controller 131. To perform I/O processing, unique names (for example, VOL1 to VOL4) used in the system correspondingly to the disk devices 132 are generally designated from software issuing I/O requests to the disk devices 132. In FIG. 7, data I/O processing for VOL1 and VOL2 is executed through either of the channel paths 1 and 2. Similarly, data I/O processing for VOL3 and VOL4 is executed through either of the channel paths 3 and 4. In general, I/O processing is executed through a channel path (free path) being free from data transfer. By connecting a plurality of channel paths to one disk in the manner as described above, throughput can be improved.

Chief resources used by the I/O processor will be described below. Important resources used in the present invention are I/O request queues 122 and a channel path control table 103. The channel path control table 103 is used for managing one channel control processor or a plurality of channel control processors 108 described above with reference to FIG. 7. The I/O request queues 122 are used for temporarily keeping I/O requests from higher-rank apparatuses in waiting states.

First, the structure of the channel path control table 103 will be described with reference to FIG. 8. The channel path control table 103 has fields for storing device identifiers 601, I/O request queue identifiers 602, the respective numbers 603 of waiting I/O requests, usable channel device numbers 4, and channel device statuses 605.

The device identifiers are generally values set by a system manager correspondingly to the respective devices at the time of the construction of the system to identify individual I/O devices. The values are so unique in the system that one device identifier is not set to different devices. Accordingly, when a device identifier is set, a device corresponding to the device identifier is determined by one-to-one correspondence. The values are also set when I/O requests are issued from software to the I/O processor 101.

The I/O request queue identifiers are used for identifying a plurality of I/O request queues 122. Each of the I/O request queues 122 substantially may be separated by any suitable unit. The structure and keeping unit of the I/O request queues 122 will be described later more in detail. The field 603 shows values indicating the respective numbers of I/O requests registered as waiting I/O requests in the I/O request queues 122. The field 604 shows usable channel devices. As described above with reference to FIG. 7, a plurality of channel paths are allocated to one device. The terminology "usable channel paths (usable channel devices)" herein used means channel paths which are 10 allowed to be used for data transfer if they are free. The usable channel paths (usable channel devices) are set by a manager at the time-of the construction of the system. For example, it is general that the manager connects a larger number of paths to a disk controller to which a highly loaded disk device is connected. The channel device status field 605 indicates whether each of channel paths is busy or not. In the drawing, "BUSY" represents the fact that the target channel path is currently used for processing of another I/O request, and "FREE" represents the fact that the target channel path is not used currently. For example, three channel paths (channel devices: "1", "2" and "10") are allocated to a disk device 132 identified by device identifier "10". Among these, channel paths of channel devices "2" and "10" are used currently. The I/O request queue 122 is managed collectively by identifier "1", and the number of waiting I/O requests in the I/O request queue 122 is 5. As another method for allocating the I/O request queues 122, two I/O request queues 122 (I/O request queue identifiers: "2" and "3") may be allocated as shown in a disk device 132 identified by device identifier "20". This shows the fact that channel devices 108 respectively have I/O request queues 122.

Figure 9:
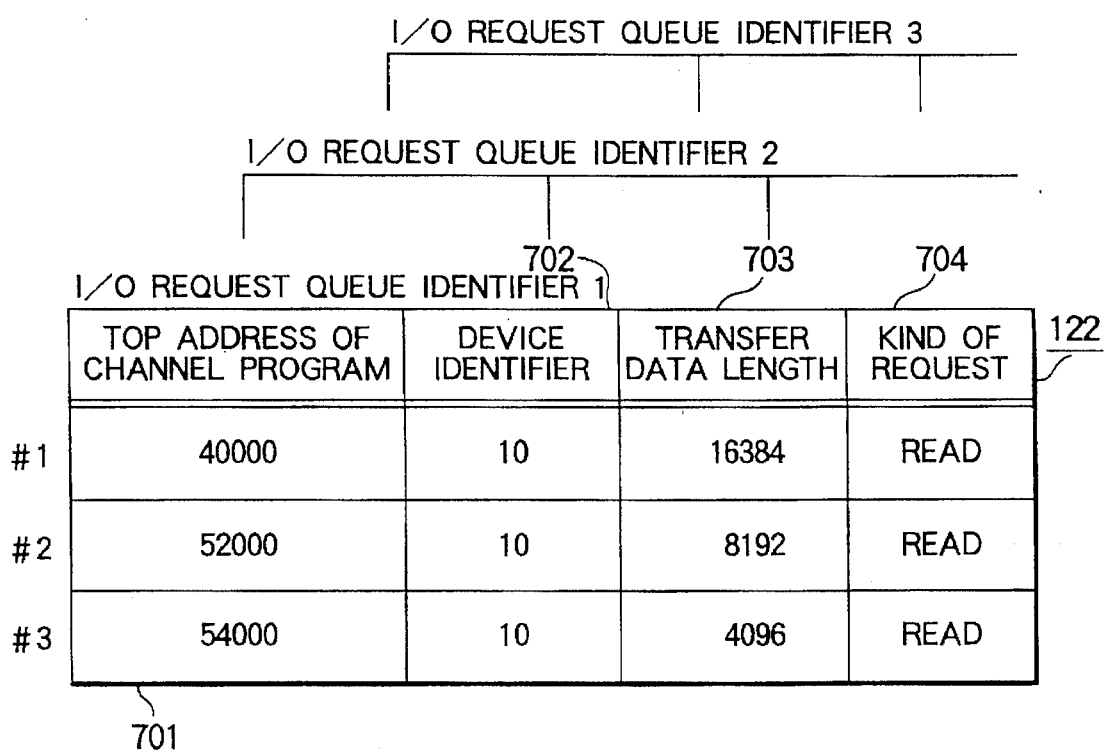
FIG. 9 is a view showing the structure of input-output request queues.

The I/0 request held in queues 122 will be described below with reference to FIG. 9. FIG. 9 is a view showing an example of the structure of the I/O request queues 122. In the following description, an I/0 request queue 122 identified by I/O request queue identifier "1" is used as an example.

The field 701 shows the respective top addresses of channel programs stored. This field is generated by software and shows the respective top address of the channel programs 123 to 125 stored on the main storage device 121. This field is used when the I/O processor 101 picks up channel programs in after-processing. The field 702 shows device identifiers. This field is used for determining a device directed by an I/O request to be processed by a corresponding channel program. The field 703 shows the length of data to be transferred on the basis of an I/O request to be processed by a corresponding channel program. The field 704 shows the kind of the I/O request, such as "READ" indicating transfer of data from a device to the main storage device, "WRITE" indicating transfer of data from the main storage device to a device, and so on. As shown in FIG. 9, a plurality of I/O request queues 122 are provided. The I/O request queues 122 are related through I/O request queue identifiers from the channel path control table 103. In this embodiment, the I/O request queues 122 are placed on the main storage device 121, it is unnecessary that the I/O request queues 122 are particularly placed on the main storage device 121. If it is possible to place the I/O request queues 122 in the I/O processor 101, the I/O request queues 122 may be placed in the I/O processor 101 to improve processing performance.

Figure 10A:
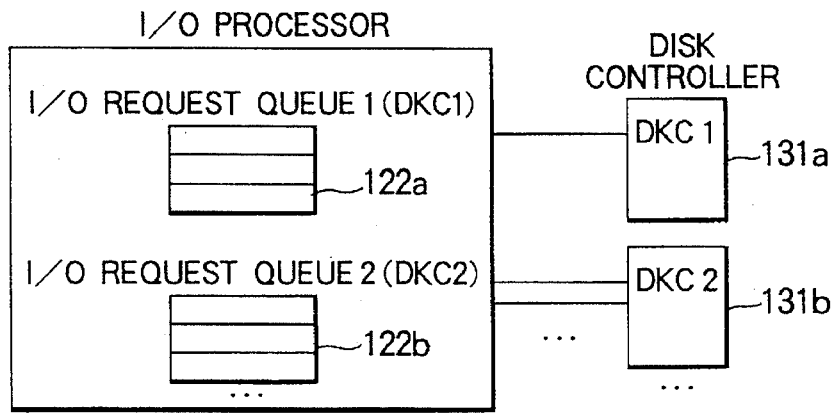
FIGS. 10A to 10C are views for explaining the arrangement of the input-output request queues.

The unit by which one I/O request queue 122 is managed will be described below with reference to FIGS. 10A through 10C.

The unit for one I/O request queue 122 can be set arbitrarily. It is substantially preferable that I/O request queues 122 are arranged correspondingly to places being higher in frequency of access and higher in the possibility of necking on performance. In the arrangement 1 shown in FIG. 10A, as an example, I/O request queues 122a and 122b are provided respectively correspondingly to two disk controllers 131a and 131b. The case where one disk controller 131a, 131b manages a large number of disk devices is considered as the case where the aforementioned arrangement is effective.

Figure 10B:
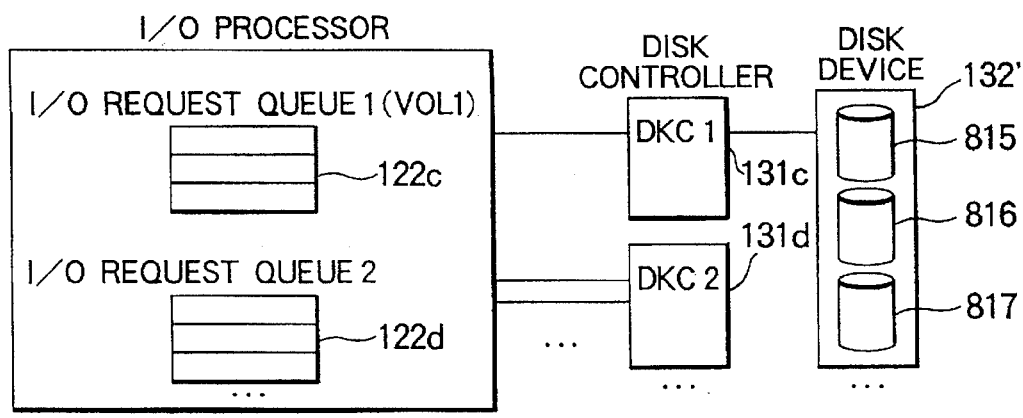

In the arrangement 2 shown in FIG. 10B, I/O request queues 122c and 122d are arranged by disk devices. The arrangement 2 is different from the arrangement 1 in that I/O request queues 122 are arranged by disk devices regardless of the number of disk controllers 131. This unit of management of I/O request queues is effective for the case where devices capable of being accessed in high frequency. For example, a disk array device 132', that is, a device which is logically considered as one disk device from the view of software but is considered as a plurality of disk devices 815, 816 and 817 capable of being accessed simultaneously from the view of the inside of the device, or a device constituted by semiconductor memories and the like and capable of being expected to have very high response, may be considered.

Figure 10C:
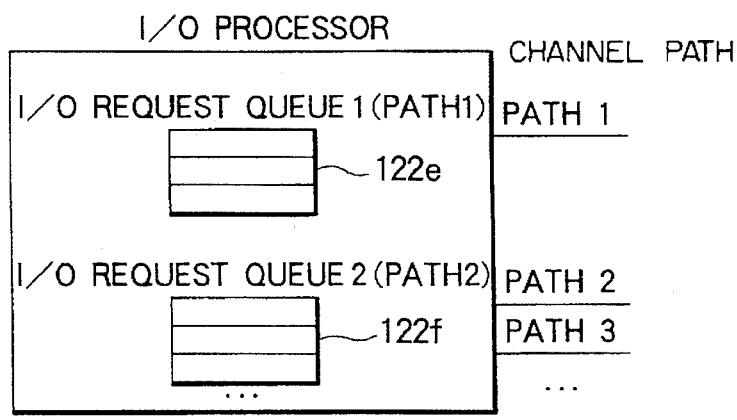

In the arrangement 3 shown in FIG. 10C, I/O request queues 122e and 122f are arranged correspondingly to channel paths. This arrangement is effective for the case where I/O requests must be processed in high frequency by using a smaller number of I/O paths or the case where short data is to be processed by using a high-speed channel.

In the present embodiment, we presume that each I/O request queue is provided in correspondence to one of the channel paths, according to the arrangement 3.

The operation of the inside of the I/O processor 101 will be described by using the aforementioned resources. FIG. 11 shows a flow of processing in the channel path selection/input-output request registration portion 104. Through acceptance of an I/O request 130 from a higher-rank apparatus, the control processor 136 starts this processing (step 901). When the channel path selection/input-output request registration portion 104 accepts the I/O request 130, the portion 104 searches the channel path control table 103' to Judge whether the usable channel device 108 which can be used for the device of a device identifier designated by the received I/O request can be used or not (step 902). This Judgment can be attained by reference to the channel device status field 605 shown in FIG. 8. As a result, if there is any channel device 108 which can be used for the device and 10 which has the status of "FREE", an I/O request queue 122 corresponding to the channel path is selected. In the case where there is no channel device 108 which can be used for the device and which has the status of "FREE", an I/O request queue identifier corresponding to the channel path smaller in the number of waiting I/O requests 130 is selected. The number of waiting I/O requests can be also obtained by reference to the field 603 indicating the number of waiting requests in FIG. 8. The selection by the number of waiting I/O requests 130 is made possible only in the case where a plurality of I/O request queues 122 are allocated to one device. Otherwise, the selection by the number of waiting I/O requests is not required. In step 904, information such as device identifier, channel program top address, transfer data length and the kind of the request is registered into an I/O request queue 122 corresponding to the I/O request queue identifier obtained in the step 903. Then, the value of the field 603 indicating the number of waiting I/O requests in the channel path control table 103 is increased by one (step 905) and a starting request'is issued to the batch control portion 106 (step 906). The I/O request newly registered in the I/O request queues is informed to the batch control period 106.

Figure 12:
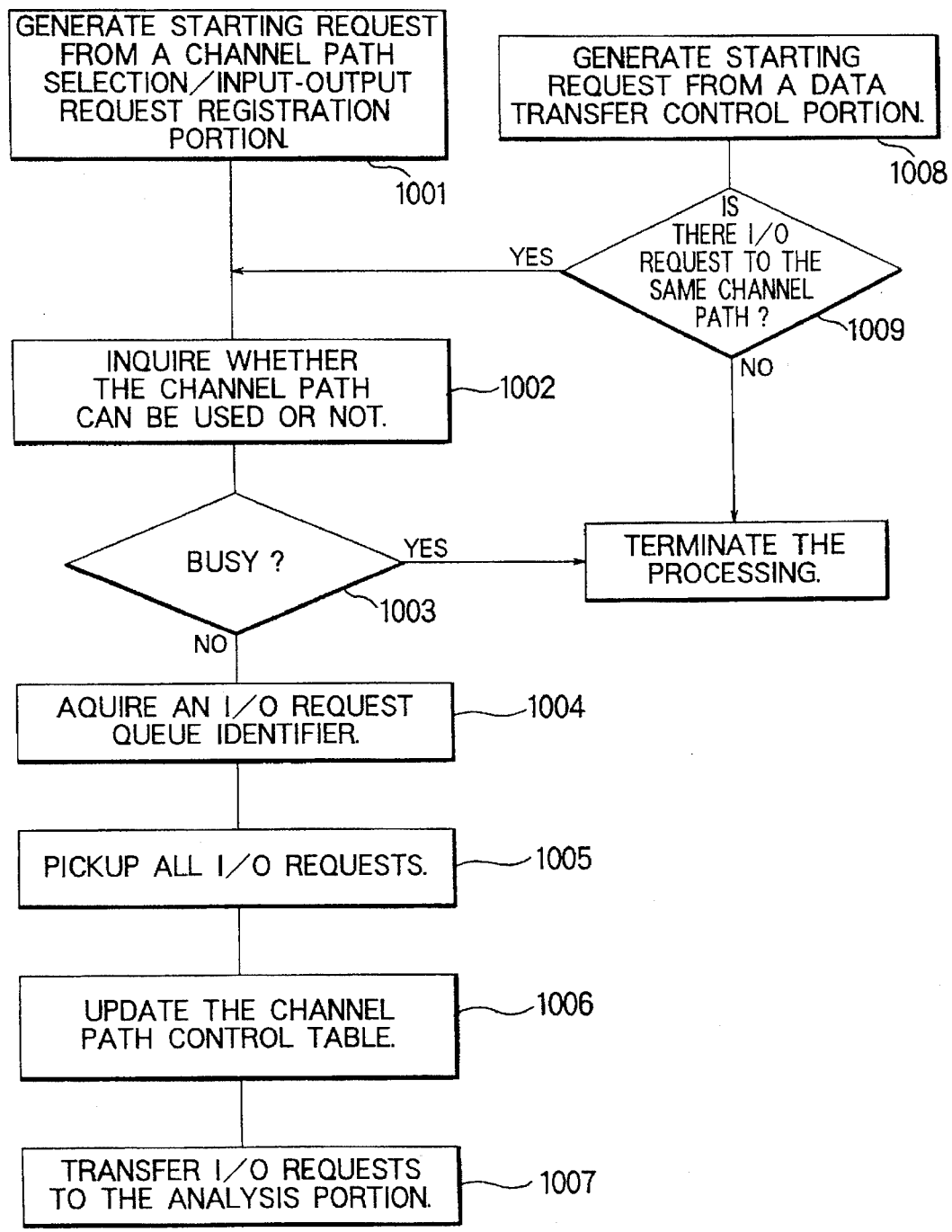
FIG. 12 is a flow chart of processing in the batch control portion.

Processing in the batch control portion 106' is one of the characteristics of the present invention. This processing will be described below by referring to FIG. 12.

There are two types of opportunities for starting the batch control portion 106. One type opportunity is a starting request from the channel path selection/input-output request registration portion 104 as described preliminarily. The other is a starting request from the data transfer processing portion 112 executed by each of channel control processors 108-i.

When a starting request is received from the channel path selection/I/O request registration portion 104 (step 1001), the batch control portion 106 inquires of the channel busy detection portion 105 whether each of channel paths which can be used for a disc device required by the received I/O request are busy or not (step 102). Here, the channel busy detection portion 105 detects by reference to the channel path control table 103 whether a channel path 142 corresponding to the device identifier designated by the I/O request is busy. A result of the detection is reported to the batch control portion 106. Then, the batch control portion 106 terminates processing if the corresponding channel path 140 is "BUSY". If the channel path is "FREE", the situation of the routine goes to the next step (step 1003). If the channel path 140 is "FREE" in the step 1003, the batch control portion 106 searches the channel path control table 103 to obtain an I/O request queue identifier for one of the I/O request queues corresponding to the channel path (step 1004). In step 1005, an instruction to take out all registered I/O requests from one of the I/O request queues 122 corresponding to the I/O request queue identifier obtained in the step 1003 is given to the I/O request batch fetch processing portion 107. Then, zero is set to the corresponding field 603 indicating the number of waiting requests, in the channel bath control table 103, and the channel device status field 605 is turned from "FREE" to "BUSY" (step 1006). Then, the plurality of I/O requests picked up by the I/O request batch fetch processing portion 107 are collectively sent to the I/O request analysis portion 111 of the channel device 108-i corresponding to the channel path (step 1007).

Another starting request from the data transfer control portion 112 is generated at the point of time when data transfer through one of channel paths is finished. At this time, information indicating the channel path at which data transfer is finished is sent to the batch control portion 106. When a starting request is received from the data transfer control portion 112 in step 1008, the batch control portion 106 searches the channel control table 103 on the basis of the information to examine whether there is any I/O request awaiting transfer of data to the corresponding channel path. If there is no I/O request awaiting data transfer as a result, the processing is terminated. If there is any I/O request awaiting data transfer, the situation of the routine goes to step 1002 to perform data transfer (step 1009).

The channel control processors 108-i and the disk controller 131 will be described below with reference to FIGS. 1 and 2.

Each of the channel control processors 108 serves to transfer commands or data mainly between itself and a device. The I/O request analysis portion 111 performs analysis on the basis of the I/O requests sent from the batch control portion 106. In the I/O request analysis portion 111, first the command batch fetch portion 109 is started to fetch channel programs collectively. The I/O requests sent from the batch control portion 106 keep the respective top addresses of channel programs so that the command batch fetch portion 109 collectively reads channel programs 123 to 125 stored in the main storage device 121 on the basis of the top addresses and transfers the channel programs 123 to 125 to the command/data buffer 113. Then, controlling is shifted to the data batch transfer portion 110 in which all write data required by some or all of the channel programs picked up by the command batch fetch portion 109 are fetched from the main storage device 121 and are stored in the command/data buffer 113. Because write data to be transferred to the command/data buffer 113 are generally present only for a channel program which require writing of data in a disk device, there is no fetching of write data for a channel program which requires reading of data from a disc device. The judgment as to necessity of fetching write data is made by referring to the field 704 indicating the kind of request in the I/O request queues 122.

Figure 16:
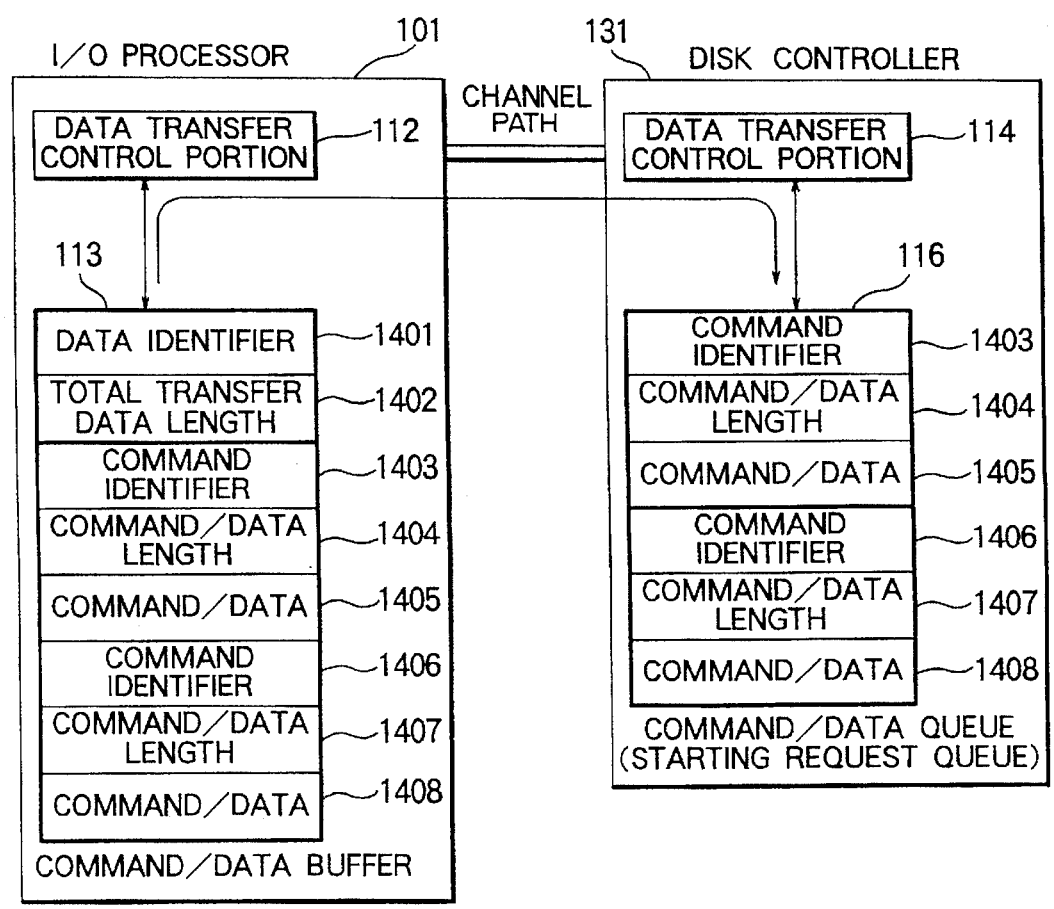
FIG. 16 is a view showing the condition of data transfer.

Commands/data transferred from the main storage device 121 are stored in the command/data buffer 113 in the I/O processor 101 as shown in FIG. 16, where a channel, program is shown as a command. The additional information other than the fetched commands and write data are provided by the input request analyze portion 111. Commands/data eg. 1405 represents a channel program and write data, if there is any. Command identifiers 1403 and 1406 and command/data lengths 1404 and 1407 are respectively added to the front of commands/data 1405 and 1408. The command identifiers 1403 and 1406 have unique values in the system. For example, a device identifier for a disc required by a channel program is used as the command identifier 1403 or 1406. Data identifier 1401 and total transfer data length 1402 are provided additionally as a header for data transfer. The data identifier 1401 has a unique value provided by transfer unit. In this embodiment, I/O request queue identifier is used as the data identifier 1401.

In this manner, unlike the conventional case, it is necessary to fetch a plurality of commands and their attendant data, so that it is necessary to increase the capacity of the command/data buffer 113 more greatly than that in the conventional case. Although it is desirable that a value obtained by the product of the number of queue positions in the I/O queue 122, the average queuing length at each queue position, of I/O requests and the average data length of one I/O request is used as the value of this capacity, there are some cases where the value of the capacity is limited to a value smaller than the above-mentioned desirable value because of the mounting of I/O processor, etc. In such cases, it may be impossible that all requests in the I/O request queue 122 are stored in the command/data buffer 113. As a measure counter to such cases, there are preferably provided controls by which I/O requests are fetched as much as can be stored in free areas in the command/data buffer 113. These controls are attained by returning I/O requests which could not be stored, to the I/O request queue 122 at the time of the execution of an operation in the command batch fetch portion 109 or data batch transfer portion 110. Because, at this time, there is some possibility that a new I/O request has been stored in a predetermined position of the I/O request queue 122, I/O sequence can be maintained by queuing at the first-order position (from which commands/data will be taken out first of all) of the I/O request queue 122. It is further necessary that the above-mentioned number of I/O requests which could not be stored is added to the value of the field 603 indicating the number of waiting requests, in the channel path control table 103. It is further necessary to recognize the positions of a plurality of I/O requests stored in the command/data buffer 113. Therefore, the batch control portion 106 replaces the channel command word top address 701 stored in a data field taken out of the I/O request queue 122 by an address in the command/data buffer 113 to thereby make it possible to attain these controls. Because this information is reserved/managed until transmission of commands/data to the disk controller 131 is terminated normally, these controls are made possible. Furthermore, a plurality of commands/data are collectively transferred to the disk controller 131, so that these controls can be applied to the case where commands/data cannot be stored because of the capacity of the queue 116 in the disk controller 131. That is, because the capacity of the queue 116 in the disk controller 131 is finite, the number of commands/data subjected to queuing is also limited. In this case, the disk controller 131 can notify commands which could not be stored in the queue 116 in the disk controller 131, so that only the commands which could not be stored, can be stored in the I/O request queue 122.

When transfer of channel programs and data to the command/data buffer 113 is completed, the data transfer control portion 112 performs transfer of commands and data to the disk controller 131. The data transfer control portion 112 transmits the data composed of the parts 1401 to 1408 thus stored in the command/data buffer 113, to the data transfer control portion 114 in the disk controller 131 through the channel path which is connected to a channel control processor to which the portion 112 belongs. When transfer of commands and data between the data transfer control portion 112 and the disk controller 131 is completed, the data transfer control portion 112 informs the batch control portion 106 of the completion of command/data transfer together with the channel device number.

The following overhead imposed on fetching of commands 123, 124 and 125 and data 126, 127 and 128 stored in the main storage device 121 into the I/O processor, as caused by execution of control in the prior art, can be reduced.

(1) Judging whether or not there is any I/O request;

(2) Taking out an I/O request;

(3) Invalidating the I/O request taken out;

(4) Extracting main storage addresses where channel commands are stored, from the I/O request;

(5) Taking one channel command out of the main storage device;

(6) Repeating the operation (5) unless one I/O request is terminated; and (7) Returning the situation of the procedure to the operation (1) to process the next I/O request.

That is, because commands/data can be collectively taken out in the operations (1) and (2), overhead imposed on shifting of control from the operation (1) to the operation (2) and from the operation (7) to the operation (1) can be reduced. Further, because taking-out of continuous channel commands and processing of a plurality of I/O requests can be performed by once control, overhead imposed on shifting of control over a plurality of micro-program modules can be reduced.

Furthermore, the following overhead which occurs when commands/data are transferred from the I/O processor to the disk controller can be reduced.

(a) Analyzing a channel command taken out of the main storage device;
(b) Judging whether the command is to be given to a disk controller or whether the command is to be given to the I/O processor, and transmitting the command to a designated disk controller only in the case where the command is to be given to the disk controller;
(c) Executing the command only in the case where the command is to be given to the I/O processor; and
(d) Repeating the procedure of from the step (a) to the step (c) unless one I/O request is terminated.

The effect that overhead imposed on shifting of control over micro-program modules is reduced is brought by performing batch processing of a plurality of I/O requests in the operations (a) to (d). Increase of performance on the basis of simplification of,the operations (b) and (c) contributes more greatly to reduction of overhead. As will be described later in detail, in the case of transmission of channel command words 123, 124, and 125 from the I/O processor 101 to the disk controller 131, the command words are collectively transferred to the disk controller 131 after commands (for example, TIC command) having no direct relation with the disk controller 131 are removed. The meaning of the TIC command is as follows. The disk controller carries out a series of procedures represented by commands such as SEEK, SEARCH and READ/WRITE but these commands are one-by-one transferred from the I/O processor to the disk controller. In the case of the SEARCH command which represents a procedure of judging whether the disk head has reached a predetermined position, however, the I/O processor starts execution of the next channel command immediately after the I/O processor transfers the SEARCH command to the disk controller, so that the I/O processor cannot operate normally without any measure. That is, if the I/O processor executes the next READ/WRITE command at this point of time, unexpected data is read/written because READ/WRITE is executed on the current position of the disk head. Therefore, it is necessary to dispose a TIC command between the SEARCH command and the READ/WRITE command to thereby provide a procedure of continuously executing the SEARCH command until arrival of the disk head at the position where the target data exists is found by the SEARCH command. By eliminating such synchronous processing from the I/O processor 101 side as shown in this embodiment, the processing which was synchronously carried out in the prior art can be made to be carried out asynchronously. As a result, the procedures of (b) and (c) can be reduced extremely.

The batch control portion 106', channel path control table 103' and channel busy detection portion 105' within a disc controller 131 are similar to the batch control portion 106, channel path control table 103 and channel busy detection portion 105 within the I/O processor 101, respectively. Two types of command/data queues are provided as follows. There are a number of command/data queues 116 which are used so as to hold commands collectively sent from the I/O processor 101 and write data. Also, there are a number of command/data queues 115 so as to hold execution result information to be transferred to the I/O processor 101 and read data from the disk devices 132-1 to 132-n. It is ideally preferable that a total number of command/data queues 115 (or 116) is the same number as the number of the disc drives, so that each queue of the queues 115 (or 116) has one-to-one correspondence with the disk devices.

The data transfer control portion 114 in the disk controller 131 selects one queue within a command/data queue 116 to store each group of a channel program and write data on the basis of the command identifier, e.g. 1403, so that each group is stored in one queue corresponding to a disc device required by the channel program included in the group after removal of the header data 1401 and 1402.

The data transfer control portion 114 decides that plural channel programs which require the same disc device are stored in the same one of the queues 116 and plural channel programs which require different disk devices are stored in different queues as much as possible.

FIG. 13 shows the structure of the disk device control table 118. The field 1101 stores disk device identifiers, the field 1102 stores command/data queue identifiers, the field 1103 stores the respective numbers of I/O requests awaiting processing, and the field 1104 stores the respective statuses of disk devices. The states of the disk devices 132, the respective command/data queues 115 and 116 corresponding to the disk devices 132, and so on, can be found from the disk device control table 18. The command processing portion 117 performs processing by reference to the disk device control table 118.

Figure 14A:
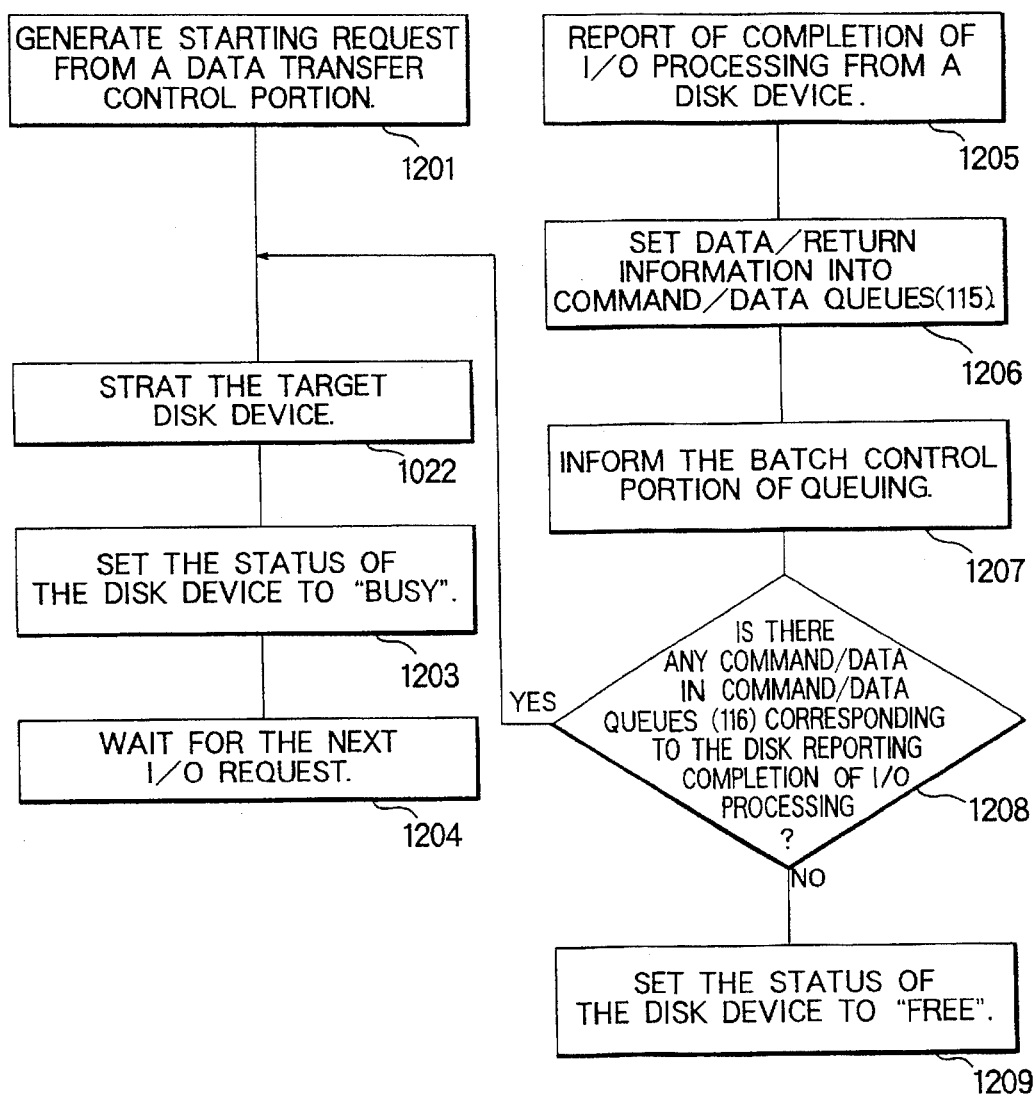
FIG. 14A is a flow chart of disk command processing in the command processing portion.

FIG. 14 shows a flow of disk command processing in the command processing portion 117. Two types of opportunities for starting the disk command processing are provided as follows. One type is based on a starting request from the data transfer control portion 114. The other type is based on a report of completion of I/O processing from the disk devices 119.

When a starting request is received from the data transfer control portion 114 (step 1201), the command processing portion 117 picks up the command identifier registered in the command/data queues 116 to find a target disk device and starts the target disk (step 1202) by commands which follows the identifier.

Figure 14B:
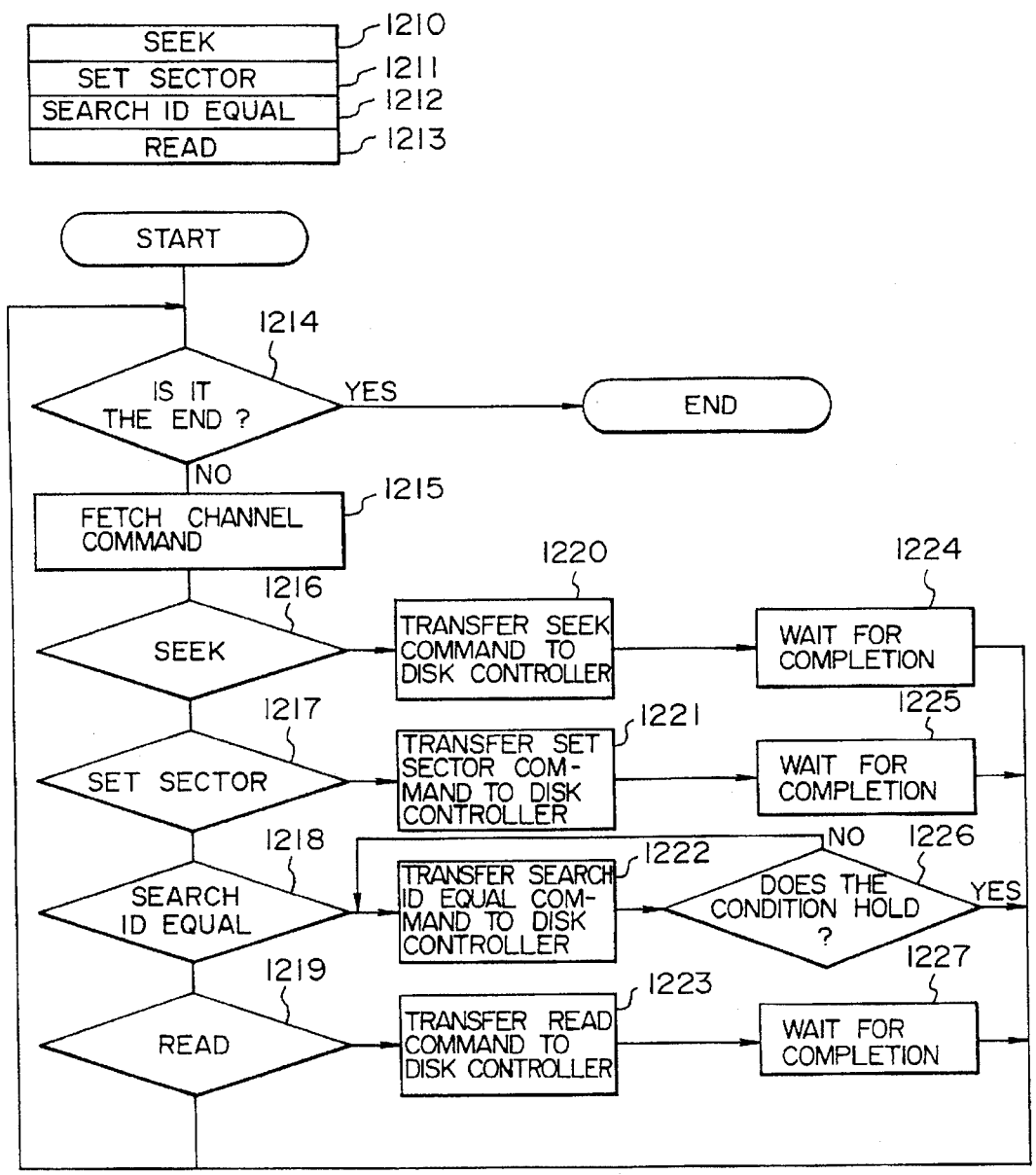
FIG. 14B is a flow chart of a part of the command processing portion 117 of a disc controller.

With the starting of the disk, processing shown in FIG. 14B is started in the background. For the starting of the processing, channel command words 1210 to 1213 are used. The channel command words 1210 to 1213 are provided by transmission from the I/O processor 101. Because, as described above, no command but commands necessary for controlling of the disk devices 132 is transmitted to the disk controller 131, the command storage form of the disk controller 131 is simplified compared with that of the main storage device. More specifically, it is exhibited by elimination of the TIC command. Accordingly, a chief object of this flow chart is to produce the same procedure as carried out by the TIC command. In step 1214, the end of channel command words is detected. In step 1215, an operation of taking out one channel command word is carried out. In step 1216, a judgment is made as to whether the given channel command is SEEK or not. If it is SEEK, the command word is transmitted to the disk controller 131, and completion of the transmission is awaited (step 1224). After the completion of the transmission, the situation of the procedure goes back to the step 1214. In step 1217, a judgment is made as to whether the given channel command is SEARCH ID EQUAL or not. If it is SEARCH ID EQUAL, the command word is transmitted to the disk controller 131. Thereafter, a judgment is made as to whether the result of execution of the command satisfies the condition of the command or not (step 1226). If it does not satisfy the condition, the step 1222 is retried. If it satisfies the condition, the step 1214 is carried out. The TIC command which was provided only in the I/O processor side in the prior art can be realized in the disk controller 131 side by the above-mentioned procedure. In step 1219, a judgment is made as to whether the given channel command is READ or not. If it is READ, the command word is transmitted to the disk controller 131, and completion of the transmission is awaited (step 1227). After the completion of the transmission, the situation of the procedure goes back to the step 1214. After the step 1202, "BUSY" is written in the status 1104 of a corresponding disk device in the disk device control table 118 (step 1203) and the next disk starting request is awaited (step 1204).

On the other hand, when a report of completion of I/O processing is received from a disk device 119 (step 1205), the command processing portion 117 sets read data or return information to a command/data queue corresponding to the disk device reporting the completion of I/O processing (step 1206). Then, the batch control portion 106' is informed of queuing (step 1207). The batch control portion 106' receiving the information of queuing performs the same processing (starting from step 1001 in FIG. 12) as in the batch control portion 106 in the I/O processor 101 to start the operation of transferring data or return information to the I/O processor.

Then, one data/command at the top of a command/data queue 116 corresponding to the disk device reporting the completion of I/O processing is picked up from the command/data queue 116, so that the situation of the routine goes to step 1202 to start the target disk device (step 1208). Then, "BUSY" is written in a corresponding column of the disk device status 1104 in the disk control table 118 (step 1203). If there is no waiting request registered in the command/data queue 116 in the step 1208, "FREE" is written as disk status in the corresponding column of the disk device status 1104 in the disk device control table.

Figure 15:
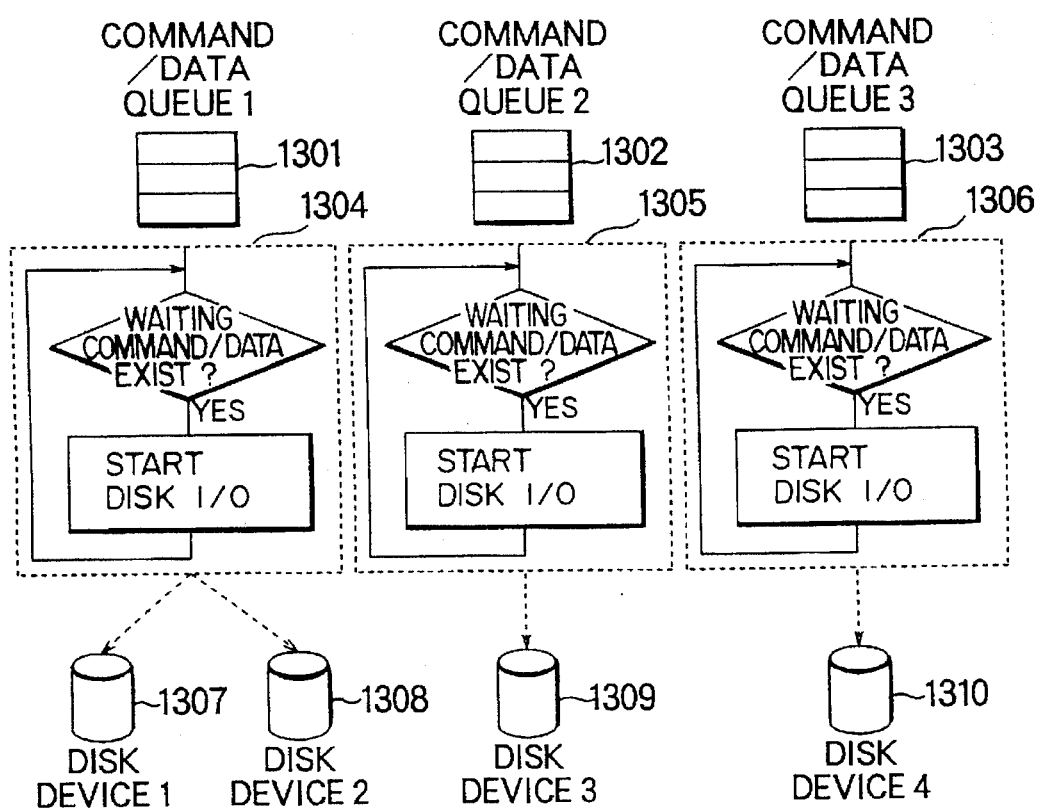
FIG. 15 is a view showing an example of the disk command processing.

The operation shown in FIG. 15 can be provided by performing the aforementioned disk command processing in parallel with respect to the plurality of command/data queues.

FIG. 15 shows the case where a command/data queue 1301 is used in common to disk devices 1307 and 1308 and where disk devices 1309 and 1310 use command/data queues, respectively. In each of disk command processings 1304, 1305 and 1306, a Judgment is made as to whether there is any waiting I/O request in corresponding one of the command/data queues 1301, 1302 and 1303. If there is any waiting I/O request, a corresponding disk device is started. The BUSY rates of the respective disk devices can be improved. Particularly in the case where the disk devices have a structure so that one disk device uses one command/data queue in the same manner as in the disk devices 1309 and 1310, the BUSY rates can be improved more greatly.

Transfer of different channel programs will be described below in more detail.

First, transfer of a channel program corresponding to a WRITE request will be described with reference to FIGS. 20 and 21.

Figure 20:
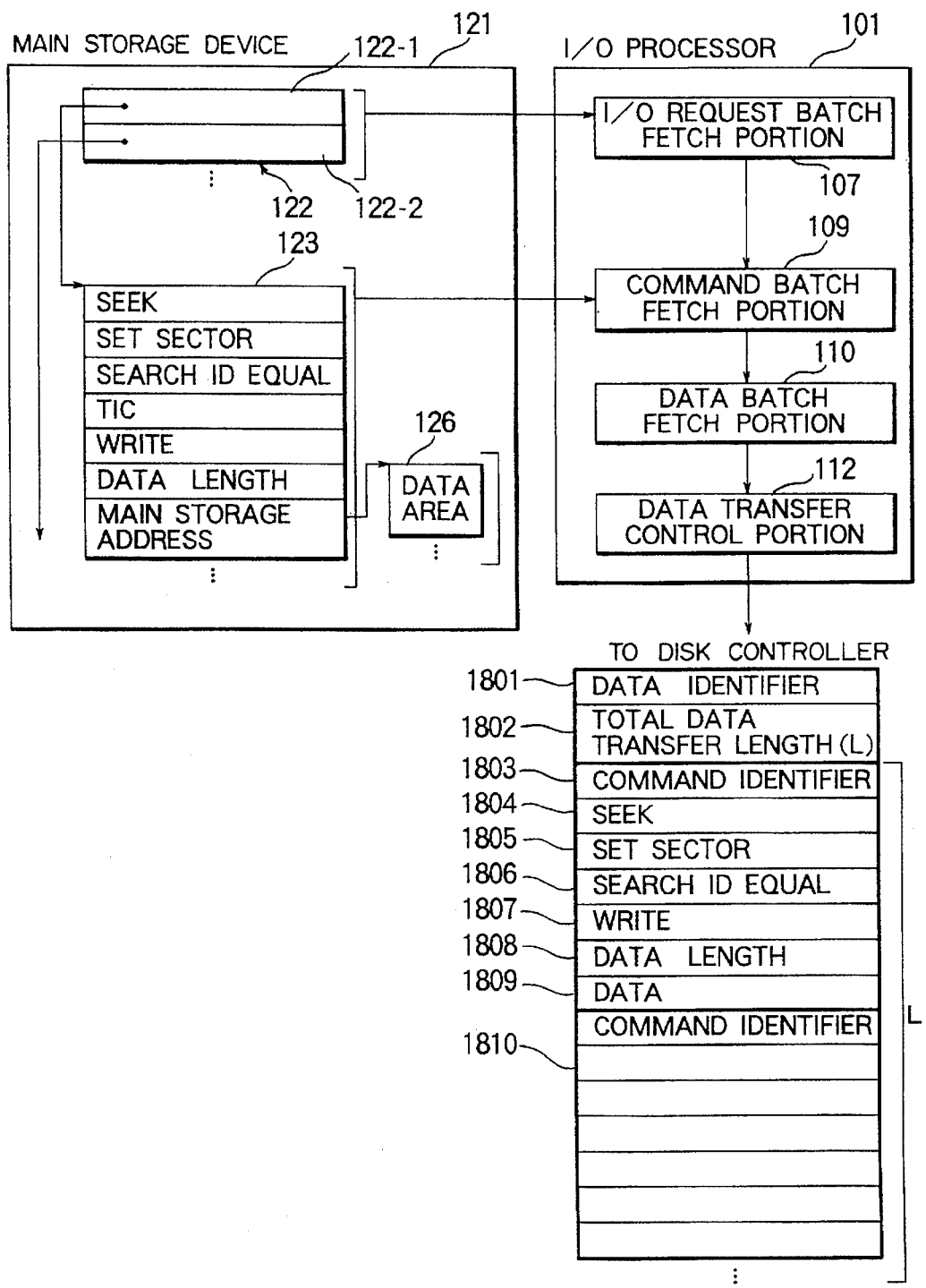
FIG. 20 is a view showing the transfer of a channel program expressing a write request, to the disk controller.

FIG. 20 shows a flow of a channel program 123 indicating a WRITE request to a disk device 132 (e.g., 132-1), in the case where the WRITE request and other I/O requests (regardless of the kind of I/O request, WRITE or READ) to the same disk device are collectively transferred to the disk controller 131. The I/O request batch fetch portion 107 in the I/O processor 101 fetches one I/O request (e.g., 122-1) or a plurality of I/O requests collectively, that is, in a batch, in an I/O request queue 122 stored in the main storage device 121. For example, a plurality of channel programs 123, 124, etc., pointed are fetched from the I/O requests thus fetched collectively. At this time, channel programs not directly related to disk I/O control are removed from the channel programs. For example, in this embodiment, TIC provided for controlling the I/O processor 101 is removed. In the form of WRITE of channel programs 2 shown in FIGS. 6A and 6B, the removing procedure is not required. If an I/O request for WRITE processing is given, the data batch fetch portion 110 fetches data 126. These channel programs and data are collected as a batch of data 1803 to 1810o After a data identifier 1801 for identifying the batch of data and data 1802 for indicating the total data transfer length L of the collected channel commands and data are added as header data to the batch of data, the resulting data is transferred to the disk controller 131 by the data transfer control portion 112 and stored in one of command/data queues 116 corresponding to the disk device 132 (e.g., 132-1) through the disk transfer control portion 114.

Accordingly, data based on the WRITE request is written in a corresponding disk device (e.g., 132-1) by the command processing portion 117.

Figure 21:
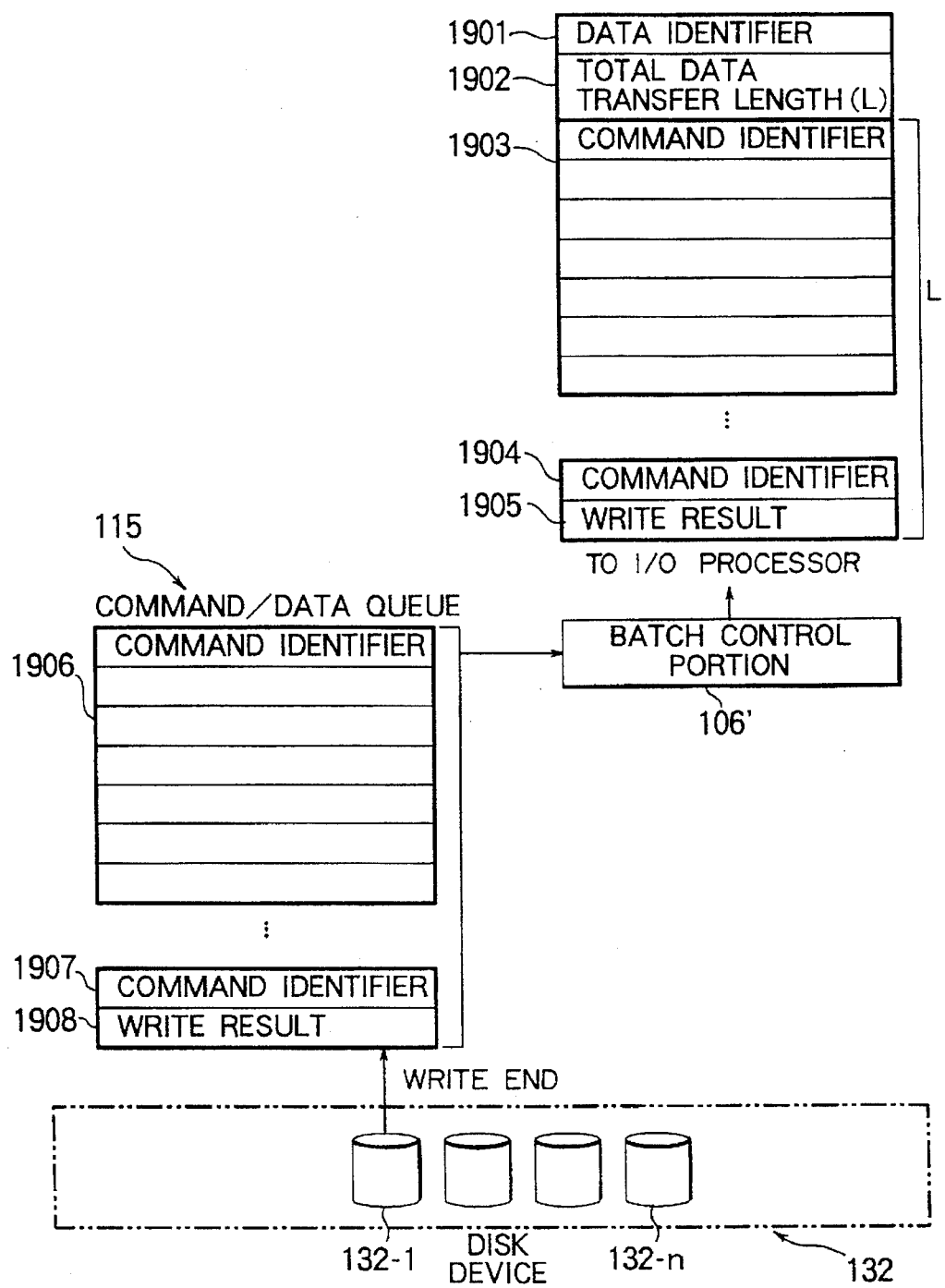
FIG. 21 is a view showing the transfer of an input-output end result in response to the write request, to the input-output processor.

FIG. 21 shows a procedure in which a report that writing of the data 1809 in a corresponding disk device (e.g., 132-1) on the basis of one WRITE request 1803 to 1809 issued in FIG. 20 is completed is transferred to the I/O processor 101. The command processing portion 117 adds a command identifier 1907 to a WRITE result 1908 for indicating whether the processing is terminated normally or abnormally as a result of outputting of data to the corresponding disk device (e.g., 132-1) on the basis of the WRITE request 1803 to 1809. Then, the command processing portion 117 stores the resulting data in a command/data queue (e.g., 115-1) corresponding to the disk device (e.g., 132-1). The batch control portion 106' of the disk controller 131 fetches one I/O result or a plurality of I/O results 1906 to 1908 from the data thus stored in one of command/data queues 115, that is, from the WRITE result and other I/O results (WRITE/ READ results) corresponding to the same disk device 132-1. Then, the batch control portion 106' adds a data identifier 1901 and data 1802 for indicating the total data transfer length L of the I/O results and data, as header data, to the I/O results to form a packet. The packet is transferred to the I/O processor 101 through the data transfer control portion 114.

In the batch control portion 106', data such as a command identifier 1904 and the like are provided additionally.

The I/O processor 101 receiving the packet transfers the collected result report to corresponding host processors in the form of a batch or separately by I/O request or by division unit.

Transfer of a channel program corresponding to a READ request will be described below with reference to FIGS. 22 and 23.

FIG. 22 shows a flow of a channel program 123 1 indicating a WRITE request in the case where the READ request and other I/O requests (regardless of the kind of I/O request, WRITE or READ) to the same disk device are collectively transferred to the disk controller 131. The I/O request batch fetch portion 107 in the I/O processor 101 fetches one I/O request or a plurality of I/O requests collectively from an I/O request queue 122 stored in the main storage device 121. For example, a plurality of channel programs 123, 124, etc., pointed are fetched from the I/O requests thus fetched collectively. At this time, channel programs not directly related to disk I/O control are removed from the channel programs. For example, in this embodiment, TIC provided for controlling the I/O processor 101 is removed. In the form of WRITE of channel programs 2 shown in FIGS. 6A and 6B, the removing procedure is not required. Because READ processing is different from WRITE processing in that there is not yet any data in the READ processing, it is necessary to memorize the address of the main storage device 121 where input data must be written. Accordingly, a main storage address 2009 is further provided as an additional data. If an I/O request for WRITE processing is given, the data batch fetch portion 110 fetches data 126. In the case of READ processing, however, the data batch fetch portion 110 makes no operation. These channel programs and data are collected as a batch of data 2003 to 2010. After a data identifier 2001 for identifying the batch of data and data 2002 for indicating the total data transfer length L of the collected channel commands and data are added as header data to the batch of data, the resulting data is transferred to the disk controller 131 by the data transfer control portion 112 and stored in a command/data queue 116 (e.g., 116-1) corresponding to the disk device 132 (e.g., 132-1) through the disk transfer control portion 114.

Accordingly, data is read from a corresponding disk device (e.g., 132-1) on the basis of the READ request by the command processing portion 117.

Figure 23:
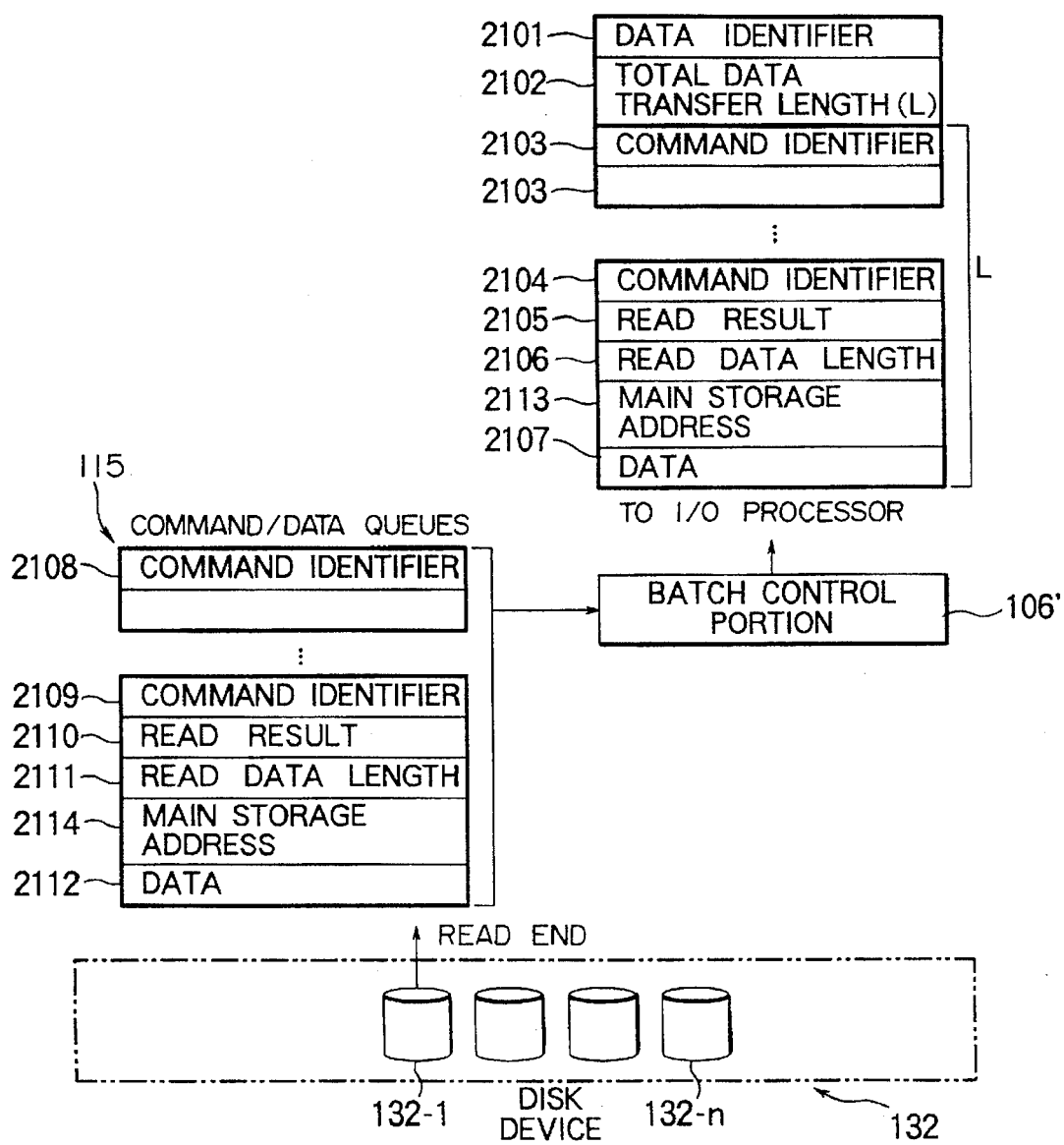
FIG. 23 is a view showing the transfer of an input-output end result in response to the read request, to the input-output processor.

FIG. 23 shows a procedure in which a report that transfer of the data 2112 from a corresponding disk device (e.g., 132-1) on the basis of one READ request 2003 to 2009 issued in FIG. 22 is completed is transferred to the I/O processor 101. The command processing portion 117 adds a command identifier 2109 to a READ result 2110 for indicating whether the processing is terminated normally or abnormally as a result of out-putting of data to the corresponding disk device (e.g., 132-1) on the basis of the READ request 2003 to 2009. Then, the command processing portion 117 stores the resulting data in a command/data queue (e.g., 115-1) corresponding to the disk device (e.g., 132-1). The batch control portion 106' of the disk controller 131 fetches one I/O result or a plurality of I/O results 2108 to 2112 and a main storage address 2114 from the data thus stored in the command/data queue 115-1, that is, from the READ result and other I/O results (WRITE/READ results) corresponding to the same disk device 132-1. Then, the batch control portion 106' adds a data identifier 2101 and data 2102 for indicating the total data transfer length L of the thus collectively fetched I/O results and data, as header data, to the I/O results to form a packet. The packet is transferred to the I/O processor 101 through the data transfer control portion 114.

In the batch control portion 106', data 2103, 2104, etc. such as a command identifier 2103 and the like are provided additionally.

The I/O processor 101 receiving the packet transfers the collected result report to corresponding host processors in the form of a batch or separately by I/O request or by division unit.

In the case where the I/O request is a READ request, data must be written in a predetermined area of the main storage device 121. Data is written after the place where the data is written is calculated on the basis of the main storage address 2113 transferred thereto.

As described above, in the case where the I/O request is a READ request for making a request to read data from a disk device, the I/O processor 101 transfers the channel program together with an address for writing data in the main storage device 121, to the disk controller 131 so that when the disk controller reads data from the disk device in response to the READ request, the I/O processor can write the data in the address of the main storage device by transferring the write address 2114 together with the I/O results 2108 to 2112 containing the read data to the I/O processor.

In this case, the I/O processor may collect the channel program indicating one READ request and a write address for the channel program to transfer the thus collected data to the disk controller or may collect the channel program indicating one READ request and other I/O requests to transfer the thus collected data to the disk controller.

The disk controller may collect the I/O result containing data in response to one READ request and a write address for the I/O result to transfer the collected data to the I/O processor or may collect the I/O result and other I/O results related to the same disk device to transfer the collected data to the I/O processor.

Furthermore, in the disk controller, write addresses corresponding to channel programs indicating a plurality of I/O requests containing a READ request, related to one disk device, as separately transferred to the disk controller from the I/O processor, may be managed collectively, so that the I/O result containing data read in response to the READ request and other I/O results corresponding to the plurality of I/O requests may be collectively transferred to the I/O processor.

A flow of data between the I/O processor 101 and the disk controller 131 in the present invention will be compared with that in the prior art by reference to FIGS. 17A and 17B. In the conventional channel control, I/O requests are one-by-one picked up or transferred from an I/O request queue and channel command words within each channel program are transferred one-by-one after confirming execution of completion of a preceding one of them have been completed. Accordingly, an overhead is put for picking up each channel program and an overhead is put for transfer of each channel command word. Therefore, transfer time 1508–1512 for commands and data for single channel program is large. Furthermore, dummy periods between transfer of different channel progrlams exist. Accordingly, if the I/O request queue is highly loaded, I/O requests which cannot be processed any more are accumulated in the I/O request queue as shown in the reference numerals 1501 to 1505.

On the contrary, in the data flow by the channel control of this embodiment as shown in FIG. 17B, a plurality of I/O requests stored in the I/O request queues are collectively picked up and they are transferred collectively. Execution of each channel command word is controlled by the disc controller after the latter has received the channel program. Therefore, plurality of commands/data can be transferred with less overhead as shown in the command/data transfers 1515 or 1516. The number of collective processings varies according to the load so that, at a low load, the number approaches that in the conventional channel operation and, at a high load, the number of collective processings increases. Because the aforementioned control is performed automatically, a large number of I/O requests are not awaited unnecessarily so that commands/data can be transferred in as short response as possible. Because interference of overhead can be limited to the minimum of necessity by the collection of I/O requests, relatively high throughput compared with the conventional channel device can be achieved. Particularly as the channel speed increases, the effect of the invention increases. This is because the increase of the relative overhead rate caused by the fact that the overhead does not change though the data transfer time is shortened by the increase of the channel speed can be suppressed in this embodiment. It is further supposed that the cable length between the I/O processor and the disk controller to thereby form a channel path may be enlarged for extension of the system in the future. As the channel path is enlarged as described above, the time required for establishing connection between the two is elongated. As a result, overhead at the time of data transfer increases. Even in the case, efficient data transfer can be made in this embodiment while suppressing the increase of overhead.

(Embodiment 2)

Another embodiment of the invention will be described below.

Figure 18:
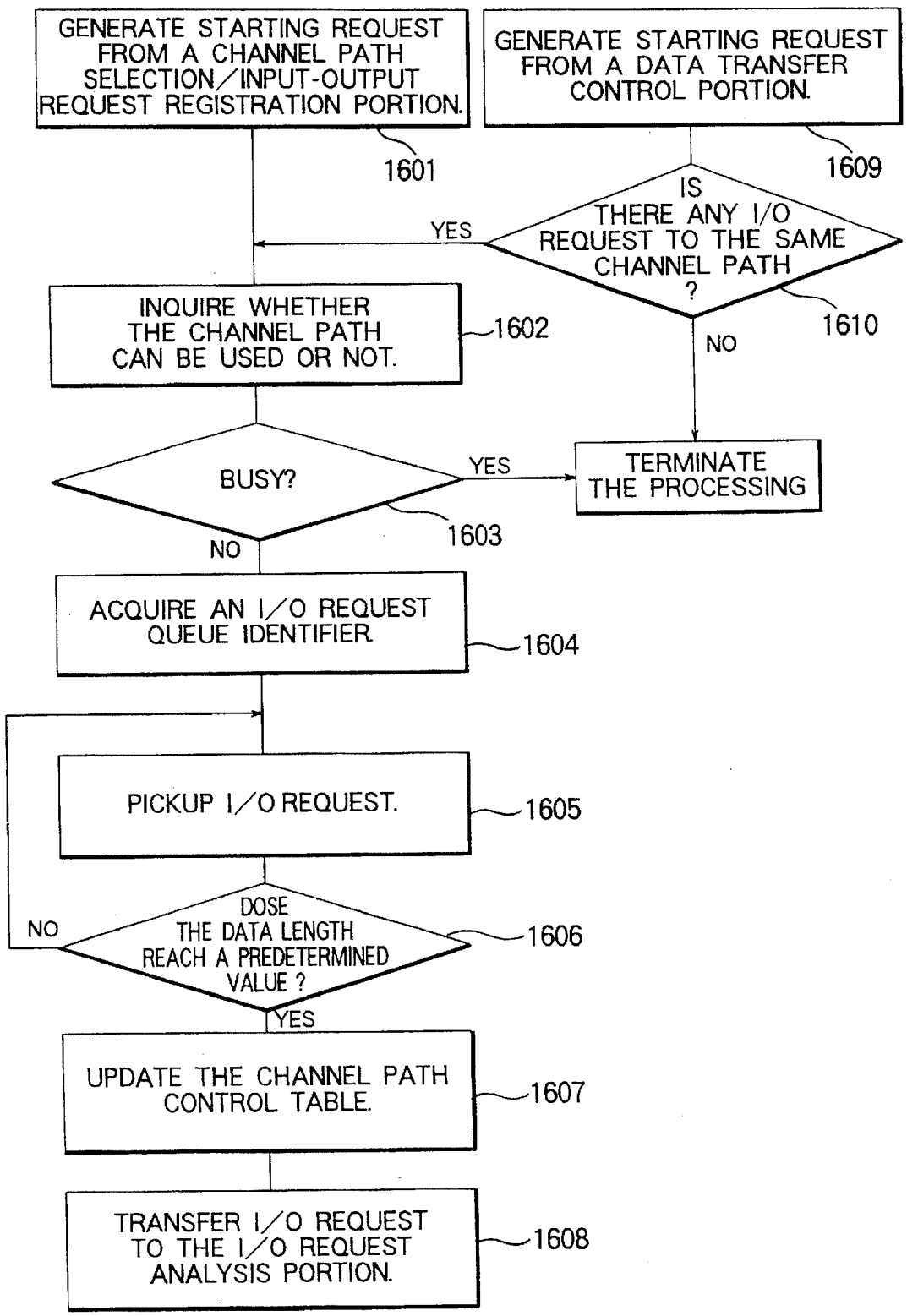
FIG. 18 is a flow chart of processing in the batch control portion in the case where response preferential control is performed in another embodiment.

FIG. 18 is a view showing a flow of processing in the batch control portion 106 in the case where response preferential control is performed in the embodiment. Similarly to the aforementioned embodiment, there are two starting opportunities in processing in the batch control portion 106 in this embodiment. One is a starting request from the channel path selection/input-output request registration portion 104. The other is a starting request from the data transfer processing portion 112. When a starting request is issued from the I/O request registration portion 104 (step 1601), the batch control portion 106 uses the channel busy detection portion 105 to refer to the channel path control table 103 to thereby detect whether a channel path corresponding to the device identifier subjected to the I/O request can be used or not (step 1602). If the target channel path 140 is "BUSY" as a result, the processing is terminated. If the target channel path is not "BUSY" as a result, the situation of the routine goes to step 1604 (step 1603). In the step 1604, an I/O request queue identifier corresponding to the channel path is acquired from the table path control table 103. Then, I/O requests are picked up from the I/O request queues 122 corresponding to the I/O request identifier acquired in the step 1604 while the data length of data to be transferred to the disk controller 131 is added. When the data length exceeds a predetermined length, the picking-up of I/O requests is terminated (steps 1605 and 1606). In the case where there is no I/O request to be picked up in the step 1606 as well as the case where the data length exceeds a predetermined length, the situation of the routine goes to the next step. When the picking-up of I/O requests is completed, a value obtained by subtracting the number of the thus picked-up I/O requests from a corresponding column of the field 603 indicating the number of waiting requests in the channel path control table 103 is set to the column of the field 603 indicating the number of waiting requests and "BUSY" is set to a corresponding column of the channel device status field 605 (step 1607). Then, the plurality of I/O requests thus picked up are collectively sent to the I/O request analysis portion 111 (step 1608).

A starting request from the data transfer control portion 112 as the other starting opportunity is generated at a point of time when data transfer through any channel path is completed. At this time, information indicating the channel path through which data transfer is completed, and the like, are sent from the data transfer control portion 112 (step 1609). In step 1610, the channel path control table 103 is searched on the basis of the information to examine whether there is any waiting I/O request using the channel path. If there is no waiting I/O request as a result, the processing is terminated. If there is any waiting I/O request, the situation of the routine goes to step 1602.

By performing the aforementioned control in the batch control portion 106, I/O control in preference of response with respect to higher-rank apparatuses and the like can be provided. When the number of collections are limited, the data/command transfer time is shortened so that throughput is more or less lowered. This embodiment is however effective for the case where preference of response with respect to higher-rank apparatuses and the like is required.

(Embodiment 3)

A further embodiment of the invention will be described below.

Figure 19:
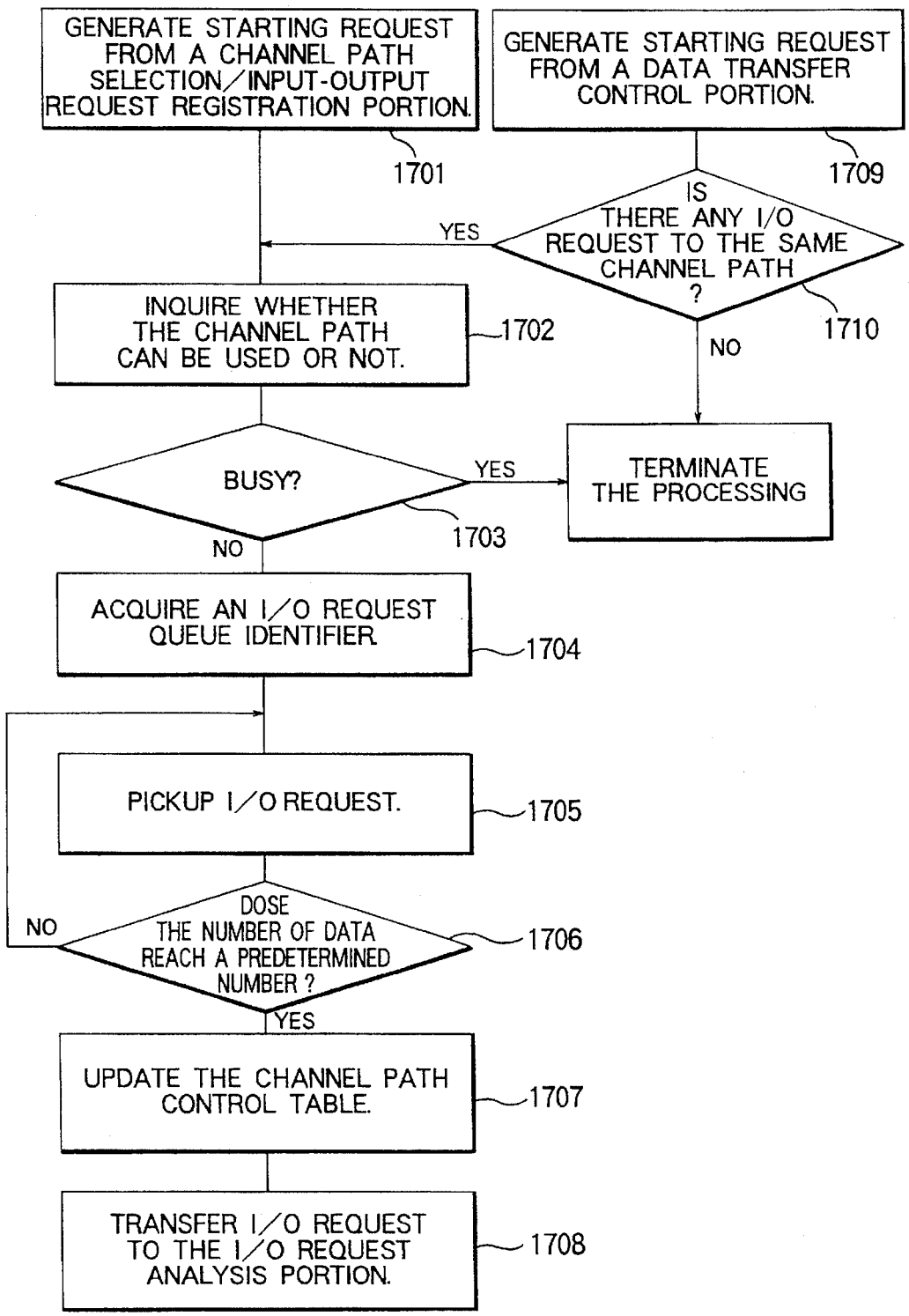
FIG. 19 is a flow chart of processing in the batch control portion in the case where response preferential control is performed in a further embodiment.

FIG. 19 is a view showing a flow of processing in the batch control portion 106' in the case where response preferential control is performed in this embodiment in the same manner as in the previous embodiment. In this embodiment, processing in step 1706 is different from that in the step 1606 in the afore-mentioned embodiment. In this embodiment, when a predetermined number of I/O requests are picked up from an I/O request queue corresponding to the I/O request identifier obtained in step 1704, the picking-up of I/O requests is terminated. That is, in the step 1706, a judgment is made as to whether the number of I/O requests picked up reaches a predetermined number (or whether there is no I/O request to be picked up). If the number of I/O requests is smaller than the predetermined number, the picking-up of I/O requests is continued in the step 1705. When the number of I/O requests picked up exceeds the predetermined number, the situation of the routine goes to the next step. The procedure of picking up I/O requests can be performed at a higher speed by changing the step 1602 in the previous embodiment to step 1701 in this embodiment. This reason is as follows. In the case where channel programs are designated as a set of channel programs, in the previous embodiment, data length must be calculated while tracing back the chain of channel programs by several stages whenever an I/O request is picked up. On the contrary, in this embodiment, counting the number of I/O requests picked up is required merely. In this embodiment, however, there is no consideration of data length which is a large factor for the time required for using the channel path. Accordingly, this embodiment is not suitable for the case where the change of I/O request length is large, but this embodiment is effective under the circumstances that the change of I/O request length is small.

Other procedures in this embodiment are carried out in the same manner as in the previous embodiment.

(Embodiment 4)

Figure 24:
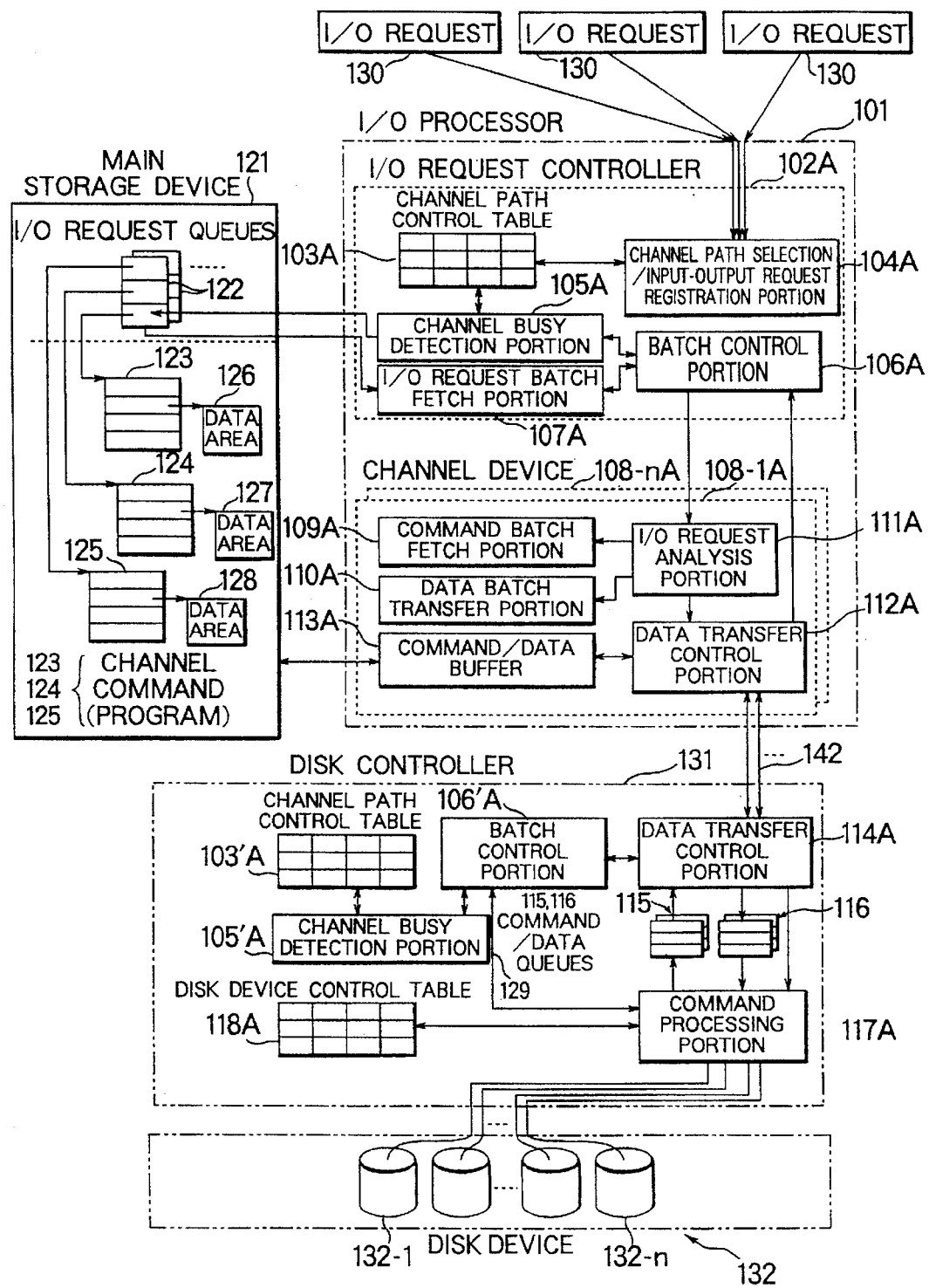
FIG. 24 is a block diagram showing the structure of a further embodiment of the present invention.

Although each of the embodiments in FIGS. 1 and 2 shows the case where controlling is performed by using control processors 136, 137 and 140, the invention can be applied to the case where the functions of these processors may be respectively replaced by hardware for exclusive use. FIG. 24 is a block diagram showing the case where the all structure as shown in FIGS. 1 and 2 is replaced by hardware. In the drawing, the reference symbol A is added to each of the reference numerals referring to parts having the same functions as in the blocks of FIG. 2, for simplification of description.

As described above, according to the present invention, I/O processing in which not only overhead required for starting and terminating a channel is limited to the minimum required but the response time is little reduced can be provided.

What is claimed is:

1. An input/output control method in a system which includes an control apparatus which controls execution of a plurality of input/output requests issued by an upper apparatus each requesting a data write into or a data read from one of a plurality of external storage apparatuses and an external storage control apparatus for controlling said plurality of external storage apparatuses, based upon commands issued by said input/output control apparatus, the method comprising the steps of:

(a) reading out by said input/output control apparatus, plurality of Control programs designated by plural input/output requests issued by said upper apparatus, from a storage which holds a plurality of control programs, wherein each of said plurality of control programs comprises a distinctly executable one of said plurality of input/output requests to be executed by the external storage control apparatus;

(b) transferring said read out control programs collectively as one transfer unit to said external storage control apparatus;

(c) storing said transferring control programs in a memory within said external storage control apparatus; and, (d) executing said stored control programs under control of said external storage control apparatus;

wherein said executing step (d) includes the step of sequentially executing a plurality of commands included in said stored control programs at timings which are dependent upon operations of one of said plurality of external storage apparatuses which is to be controlled by said control programs.

2. The input/output control method according to claim 1, further comprising the step of:

(e) reading out, by said input/output control apparatus, write data designated by said read out control programs, if there is any, from said storage;

wherein said transferring step (b) includes the step of transferring the read out control programs and said read out write data to said external storage control apparatus;

said method further comprising the steps (f) storing the transferred write data in a memory within said external storage control apparatus;

(g) transferring, by said external storage control apparatus, the stored write data to one of said external storage apparatuses to be controlled by said stored control programs.

3. The input/output control method according to claim 2, wherein the transferring step comprises the step of transferring the read out control programs and said read out write data to said external storage control apparatus together.

4. The input/output control method according to claim 1, wherein the executing step (d) further comprises the steps of;

reading out data designated by said stored control programs, if there is any, from one of said plurality of external storage apparatuses; and, transferring the read out data to said input/output control apparatus together with a write address of said storage designated by said stored control programs.

5. The input/output control method according to claim 1 wherein the transferring step (b) comprises adding a header to the plurality of control programs transferred collectively as one transfer unit wherein the header is representative of the one transfer unit.

6. The input/output control method according to claim 5 wherein said header comprises information identifying a plurality of control programs transferred collectively as one transfer unit.

7. The input/output control method according to claim 5 wherein the header comprises information representative of the total data transfer length of the plurality of control programs transferred collectively as one transfer unit.

8. The input/output control method according to claim 1, further comprising the step of:

(e) transferring a result of said executing step (d) collectively as one transfer unit to said input/output apparatus.

9. An input/output control method in a system which includes an input/output control apparatus which controls execution of a plurality of input/output requests issued by an upper apparatus each requesting data write into or data read from one of a plurality of external storage apparatuses, and an external storage control apparatus for controlling said plurality of external storage apparatuses based upon commands issued by said input/output control apparatus, the method comprising the steps of:

(a) reading out, by said input/output control apparatus, a plurality of control programs designated by plural input/output requests issued by said upper apparatus, from a storage which holds a plurality of control programs, wherein each of said plurality of control programs comprises a distinctly executable one of said plurality of input/output requests to be executed by the external storage control apparatus;

(b) reading out, by said input/output control apparatus, write data designated by said stored control program, if there is any, from said storage;

(c) temporarily storing said read out control programs and said read out write data in a memory within said input/output control apparatus;

(d) transferring said read out control programs in a batch as one transfer unit and said read out write data to said external storage control apparatus and, (e) processing the read out control programs and the read out write data by the external storage control apparatus;

wherein the processing step (e) includes the steps of sequentially executing a plurality of commands, included in said stored read out control programs and said read out write data, at timings which are dependent upon operations of one of said plurality of external storage apparatuses which is to be controlled by said control programs.

10. The input/output control method according to claim 9 wherein the transferring comprises adding a header to the plurality of control programs transferred collectively as one transfer unit wherein the header is representative of the one batch.

11. The input/output control method according to claim 10 wherein said header comprises information identifying a plurality of control programs transferred collectively as one batch.

12. The input/output control method according to claim 10 wherein the header comprises information representative of the total data transfer length of the plurality of control programs transferred collectively as one batch.

13. An input/output control method in a system which includes an input/output control apparatus which controls execution of a plurality of input/output requests issued by an upper apparatus each requesting data write into or data read from one of a plurality of external storage apparatuses, and an external storage control apparatus for controlling said plurality external storage apparatuses based upon commands issued by Said input/output control apparatus, the method comprising the steps of:

(a) selecting plural input/output requests to be processed among input/output requests issued by said upper apparatus:

(b) reading out, by said input/output control apparatus, plural control programs designated by said selected plural input/output requests, from a storage which holds a plurality of control programs wherein each of said plurality of control programs comprises a distinctly executable one of said plurality of input/output requests to be executed by the external storage control apparatus;

(c) transferring said read out control programs collectively in a batch as one transfer unit to said external storage control apparatus;

(d) storing said transferred control programs, in a memory within said external storage control apparatus; and, (e) executing said stored Control programs under control of said external storage control apparatus;

wherein said executing steps (e) include the steps of executing plural ones of said stored control programs in parallel, wherein said plural ones of said stored control programs are those which control different ones of said plurality of external storage apparatuses.

14. The input/output control method according to claim 13, wherein said storing step (d) includes the step of storing said transferred control programs into a plurality of command storage areas;

wherein said executing step (e) includes the step of executing plural ones of said stored control programs in parallel, wherein said plural ones of said stored control programs are those which are stored in different ones of said command storage areas and controls different ones of said plurality of external storage apparatuses.

15. The input/output control method according to claim 13, wherein the transferring step (c) comprises the step of transferring a plurality of identification information together with the read out control programs, each identification information identifying one of said plurality of external storage apparatuses which is to be controlled by one of said read out control programs;

wherein said executing step (e) further includes the step of deciding one of said plurality of external storage apparatuses to be controlled by each of said transferred control programs, based upon one of said plurality of identification information corresponding to said each transferred control program.

16. The input/output control method according to claim 13 further comprising the step of:

(f) reading out, by said input/output control apparatus, one or plural write data designated by one or plural ones of said read out control programs, if there is any, from said storage;

wherein said transferring step includes the step of transferring the read out control programs and said read out one or plural write data to said external storage control apparatus.

17. The input/output control method according to claim 16, wherein the read out control programs and said read out one or plural write data are transferred together to said external storage control apparatus.

18. The input/output control method according to claim 16, wherein said selecting step includes the step of selecting the plural input/output requests to be processed under a condition that a total amount of write data required by plural ones of said input/output request does not exceed a predetermined value.

19. The input/output control method according to claim 16, wherein said selecting step includes the step of selecting the plural input/output requests to be processed under a condition that a total number of the selected input/output request does not exceed a predetermined value.

20. The input/output control method according to claim 13, wherein said input/output control apparatus is connected to said external storage control apparatus via a plurality of channel paths;

wherein each external storage apparatus is assigned with at least one of the channel paths;

wherein said selecting step includes the step of selecting plural input/output requests which require input/output operations to one or plural ones of said external storage apparatus which are assigned with the same one of said channel paths.

21. The input/output control method according to claim 20, further comprising the step of:

storing each of plural input/output requests issued by said upper apparatus into one of a plurality of input/output request queues each of which is provided in correspondence to one of said channel paths, wherein said one input/output queue is one corresponding to one of said channel paths which is assigned to one of said external storage apparatuses which is designated by said each input/output request;

wherein said selecting step includes the step of selecting plural input/output requests stored in a same one of said input/output request queues.

22. The input/output control method according to claim 20, wherein said selecting step is executed when an input/output request is issued newly by said upper apparatus, under a condition that a channel path assigned to an external storage apparatus designated by said input/output request can be used.

23. The input/output control method according to claim 20, wherein said selecting step is executed when one of said channel paths has turned from an in-use state to an out-of-use state.

24. The input/output control method according to claim 13, further comprising the steps of:

(f) temporarily storing into a predetermined storage area within said external storage control apparatus, responses which have been issued from external storage apparatuses under control of said stored control programs as a result of execution thereof and which need to be transmitted to said input/output control apparatus; and (g) transferring responses stored in said predetermined storage, if there are any, together to said input/output control apparatus.

25. The input/output control method according to claim 13, wherein the transferring comprises adding a header to the plurality of control programs transferred collectively as one transfer unit wherein the header is representative of the one batch.

26. The input/output control method according to claim 25 wherein said header comprises information identifying a plurality of control programs transferred collectively as one batch.

27. The input/output control method according to claim 25 wherein the header comprises information representative of the total data transfer length of the plurality of control programs transferred collectively as one batch.

28. The input/output control method according to claim 13, further comprising the step of:

(f) transferring a result of said executing step collectively as one transfer unit to said input/output control apparatus.

29. An input/output control system, comprising:

an input/output control apparatus which controls execution of a plurality of input/output requests issued by an upper apparatus each requesting data write into or data read from one of a plurality of external storage apparatuses; and, an external storage control apparatus for controlling said plurality of external storage apparatuses based upon commands issued by said input/output control apparatus;

said input/output control apparatus including:
(a1) means for reading out a plurality of control programs designated by at least one of said plurality of input/output requests issued by skid umber apparatus from a storage which holds a plurality of control programs; and,
(a2) means for transferring said read out control programs collectively in a batch as one transfer unit to said external storage control apparatus, wherein each of said control programs in the transfer unit is a distinct one of said input/output requests independently executable by said external storage control apparatus;

said external control apparatus including:
(b1) means for storing said transferred control programs in a memory within said external storage control apparatus; and
(b2) means for executing said stored control programs;
wherein said executing means (b2) includes means for sequentially executing a plurality of commands included in said stored control programs at timings which are dependent upon operations of one of said plurality of external storage apparatuses which is to be controlled by said control programs.

30. The input/output control system according to claim 29,
wherein said input/output control apparatus further includes:
(a3) means for reading out write data designated by said stored control programs, if there is any, from said storage;
wherein said transferring means (a2) includes means for transferring the read out control programs and said read out write data to said external storage control apparatus;
wherein said external storage control apparatus further includes:
(b3) means for storing the transferred write data within said external storage control apparatus;
(b4) means for transferring the stored write data to one of said external storage apparatuses to be controlled by said stored control programs.

31. The input/output control system according to claim 30, wherein said transferring means includes means for transferring the read out control programs and said read out write data together to said external storage control apparatus.

32. The input/output control system according to claim 29, wherein the executing means (b2) includes:
means for reading out data designated by said stored control programs, if there is any, from one of said plurality of external storage apparatuses; and,
means for transferring the read out data to said input/output control apparatus together with a write address of said storage designated by said stored control programs.

33. The input/output control system according to claim 29 wherein the transferring comprises adding a header to the plurality of control programs transferred collectively as one transfer unit wherein the header is representative of the one transfer unit.

34. The input/output control system according to claim 33 wherein said header comprises information identifying a plurality of control programs transferred collectively as one transfer unit.

35. The input/output control system according to claim 33 wherein the header comprises information representative of the total data transfer length of the plurality of control programs transferred collectively as one transfer unit.

36. The input/output control system according to claim 29, wherein:
said input/output control apparatus further includes:
(a3) means for collecting separate commands contained in said plurality of control programs;and,
said external control apparatus includes:
(b3) means for separating said control programs; and,
(b4) means for executing said separated control programs.

37. An input/output control system, comprising:
an input/output control apparatus which controls execution of a plurality of input/output requests issued by an upper apparatus each requesting data write into or data read from one of a plurality of external storage apparatuses; and,
an external storage control apparatus for controlling said plurality of external storage apparatuses based upon commands issued by said input/output control apparatus;
said input/output control apparatus including:
(a) means for reading out a plurality of control programs designated by at least one of said plurality of input/output requests issued by said upper apparatus, from a storage which holds a plurality of said control programs, wherein each of said control programs is independently executable by said external storage control apparatus;
(b) means for reading out write data designated by said read out control programs, if there is any, from said storage;
(c) means for temporarily storing said read out control programs and said read out write data in a memory within said input/output control apparatus; and,
(d) means for transferring said read out control programs collectively in a batch as one transfer unit and said read out write data to said external storage control apparatus;
(e) means for processing the read out control programs and the read out write data in the external storage control apparatus;
wherein the processing step (e, includes a step of processing plural ones of the stored control programs in parallel at timings which are dependent upon operations of one of said plurality of external storage apparatuses which is to be controlled by said control programs; and,
wherein the plural ones of said stored control programs are those which control different ones of said plurality of external storage apparatuses.

38. The input/output control system according to claim 37 wherein the transferring comprises adding a header to the plurality of control programs transferred collectively as one transfer unit wherein the header is representative of the one batch.

39. The input/output control system according to claim 38 wherein said header comprises information identifying a plurality of control programs transferred collectively as one batch.

40. The input/output control system according to claim 38 wherein the header comprises information representative of the total data transfer length of the plurality of control programs transferred collectively as one batch.

41. An input/output control system, comprising:

an input/output control apparatus which controls execution of a plurality of input/output requests issued by an upper apparatus each requesting data write into or data read from one of a plurality of external storage apparatuses; and, An external storage control apparatus for controlling said plurality of external storage apparatuses based upon commands issued by said input/output control apparatus;

said input/output control apparatus including:
(a1) means for reading out plural control programs collectively in a batch as one transfer unit designated by plural ones to be processed among said plurality of input/output requests issued by said upper apparatus from a storage which holds a plurality control programs and,
(a2) means for transferring said read out control programs to said external storage control apparatus, wherein each of said control programs is independently executable by said external storage control apparatus;

said external storage control apparatus; including:
(b1) means for storing said transferred control programs in a memory within said external storage control apparatus; and,
(b2) means for executing said stored control programs:

wherein said storing means (b1) includes a plurality of storage areas which hold said transferred control programs;

wherein said executing means (b2) includes means for executing plural ones of said stored control programs in parallel at timings which are dependent upon operations of one of said plurality of external storage apparatuses which is to be controlled by said control programs; and wherein said plural ones of said stored control programs are ones which require input/output operations to different ones of said external storage apparatuses.

42. The input/output control system according to claim 41,
wherein said input/output control apparatus further includes:
(f) means for reading out one or plural write data designated by one or plural ones of said read out control programs, if there are any, from said storage;
wherein said transferring means (a2) includes means for transferring said read out control programs and said one or plural read out write data to said external storage control apparatus.

43. The input/output control system according to claim 42, wherein said transferring means includes means for transferring said read out control programs and said one or plural read out write data together to said external storage control apparatus.

44. The input/output control system according to claim 41,
wherein said input/output control apparatus is connected to said external storage control apparatus via a plurality of channel paths;
wherein each external storage apparatus is assigned with at least one of the channel paths;
wherein said reading means includes a plurality of read means provided in correspondence to one of said channel paths, each of said plurality of read means reading plural input/output requests which uses one or plural ones of said external storage apparatus which are assigned with a same one of said channel paths which corresponds to said each read means, said plurality of read means being operable in parallel to each other;
wherein said transferring means including a plurality of transfer means each provided in correspondence to one of said channel paths, each of said transfer means transferring to said external storage control apparatus, plural control programs read out by one of said plurality of read means corresponding to one of said channel paths to which said each transfer means corresponds, said plurality of transfer means being operable in parallel to each other.

45. The input/output control system according to claim 44,
wherein said input/output control apparatus further includes;
(a3) means for detecting whether channel paths are in use or not;
(a4) means for activating one of said plurality of read means corresponding to the first one of said channel paths which has been detected by said detecting means as being not in use.

46. The input/output control system according to claim 45,
wherein said input/output control apparatus further includes means responsive to receipt of an input/output request issued by said upper apparatus for detecting whether a certain one of said channel paths assigned to one of said external storage apparatuses designated by said input/output request is in use or not and for controlling said activating means depending upon a result of the detecting for the certain one channel path.

47. The input/output control system according to claim 41 wherein the transferring comprises adding a header to the plurality of control programs transferred collectively as one transfer unit wherein the header is representative of the one transfer unit.

48. The input/output control system according to claim 47 wherein said header comprises information identifying a plurality of control programs transferred collectively as one transfer unit.

49. The input/output control system according to claim 47 wherein the header comprises information representative of the total data transfer length of the plurality of control programs transferred collectively as one transfer unit.

50. The input/output control system of claim 41, wherein:
said input/output control apparatus further includes:
(a3) means for collecting separate commands contained in said plurality of control programs;
said external storage control apparatus includes:
(b3) means for separating said control programs;and,
(b4) means for executing said separate control programs.

51. An input/output control system comprising:
an input/output control apparatus which controls execution of a plurality of input/output requests issued by an upper apparatus each requesting data write into or data read from one of a plurality of external storage apparatuses; and,
an external storage control apparatus connected to said input/output control apparatus via a plurality of channel paths for controlling said plurality of external storage apparatuses based upon commands issued by said input/output control apparatus;

said input/output control apparatus including:
- (a1) a plurality of channel control processors each provided in correspondence to one of said channel paths; and,
- (a2) an input/output request control processor connected to said plurality of channel control processors;

said input/output request control processor including:
- (b1) means for storing input/output requests provided from said upper apparatus into a plurality of input/output request queues;
- (b2) means for taking out a plurality of input/output requests which are executable by using one of said channel paths corresponding to said each input/output request control processor, among a plurality of input/output requests stored in said input/output request queues; and,
- (b3) means for informing said plurality of taken input/output requests to one of said plurality of channel control processors which corresponds to said one channel;

each channel control processor including:
- (c1) means for reading out a plurality of control programs designated by said taken input/output requests, from a storage which holds control programs; and,
- (c2) means for transferring said read out control programs collectively in a batch as one transfer unit to said external storage control apparatus;

said external storage control apparatus including:
- (d1) means for storing the transferred control programs in a memory; and,
- (d2) means for executing said stored control programs;

wherein said storing means (d1) includes a plurality of storage areas Which hold said transferred control programs:

wherein said executing means (d2) includes means for executing plural ones of said stored control programs in parallel at timings which are dependent upon operations of one of said plurality of external storage apparatuses which is to be controlled by said control programs; and, wherein said plural ones of Said stored control programs are ones which require input/output operations to different ones of said external storage apparatuses.

52. The input/output control system according to claim 51 Wherein the transferring comprises adding a header to the plurality of control programs transferred collectively as one transfer unit wherein the header is representative of the one batch.

53. The input/output control system according to claim 52 wherein said header comprises information identifying a plurality of control programs transferred collectively as one batch.

54. The input/output control system according to claim 52 wherein the header comprises information representative of the total data transfer length of the plurality of control programs transferred collectively as one batch.

* * * * *

UNITED STATES PATENT AND TRADEMARK OFFICE
CERTIFICATE OF CORRECTION

PATENT NO. : 5,640,596
DATED : June 17, 1997
INVENTOR(S) : Yoshifumi Takamoto et al It is certified that error appears in the above-identified patent and that said Letters Patent is hereby corrected as shown below:

Claim 1, column 20, line 55, after "includes an" insert -- input/output--;

claim 1, column 20, line 63, after "apparatus," insert --a--;

claim 1, column 20, line 64, delete "Control" and insert therefor --control--;

claim 13, column 22, line 53, after "plurality" insert --of--;

claim 13, column 22, line 54, delete "Said" and insert therefor --said--;

claim 13, column 23, line 4, delete "," after "programs";

claim 13, column 23, line 6, delete first occurrence of "Control" and insert therefor --control--;

UNITED STATES PATENT AND TRADEMARK OFFICE
CERTIFICATE OF CORRECTION

PATENT NO. : 5,640,596
DATED : June 17, 1997
INVENTOR(S) : Yoshifumi Takamoto et al It is certified that error appears in the above-identified patent and that said Letters Patent is hereby corrected as shown below:

claim 37, column 26, line 40, delete "to-said" and insert therefor --to said--;

claim 51, column 30, line 5, delete "Which" and insert therefor --which--;

claim 51, column 30, line 13, delete "Said" and insert therefor --said--;

claim 52, line 17, delete "Wherein" and insert therefor --wherein--.

Signed and Sealed this

Thirtieth Day of March, 1999

Q. TODD DICKINSON

*Attest:*

*Attesting Officer*

*Acting Commissioner of Patents and Trademarks*